(12) United States Patent
Hodgson et al.

(10) Patent No.: US 11,338,476 B2
(45) Date of Patent: May 24, 2022

(54) PLASTIC PROCESSING APPARATUS AND RELATED METHODS

(71) Applicant: NILO GLOBAL LIMITED, Auckland (NZ)

(72) Inventors: Robert Hodgson, Auckland (NZ); Thomas Clarence Hodgson, Auckland (NZ)

(73) Assignee: NILO Global Limited, Auckland (NZ)

( * ) Notice: Subject to any disclaimer, the term of this patent is extended or adjusted under 35 U.S.C. 154(b) by 0 days.

(21) Appl. No.: 16/971,653

(22) PCT Filed: Dec. 9, 2019

(86) PCT No.: PCT/IB2019/060586
§ 371 (c)(1),
(2) Date: Aug. 20, 2020

(87) PCT Pub. No.: WO2020/115726
PCT Pub. Date: Jun. 11, 2020

(65) Prior Publication Data
US 2020/0391412 A1      Dec. 17, 2020

(30) Foreign Application Priority Data

Dec. 7, 2018   (NZ) ........................ 749067

(51) Int. Cl.
| | |
|---|---|
| B29B 17/04 | (2006.01) |
| B01F 7/16 | (2006.01) |
| B01F 7/22 | (2006.01) |
| B02C 17/02 | (2006.01) |
| B02C 18/00 | (2006.01) |
| B02C 23/36 | (2006.01) |
| B29B 17/02 | (2006.01) |

(52) U.S. Cl.
CPC .............. *B29B 17/04* (2013.01); *B01F 7/162* (2013.01); *B01F 7/225* (2013.01); *B02C 17/02* (2013.01); *B02C 18/0084* (2013.01); *B02C 18/0092* (2013.01); *B02C 23/36* (2013.01); *B29B 17/02* (2013.01); *B29B 2017/044* (2013.01); *B29B 2017/0492* (2013.01); *B29K 2023/06* (2013.01)

(58) Field of Classification Search
CPC . B02C 18/0092; B02C 18/0084; B02C 23/36; F04D 7/045; F04C 2/00
USPC .......................... 241/46.01, 74, 46.11, 46.17
See application file for complete search history.

(56) References Cited

U.S. PATENT DOCUMENTS 2,578,805 A * 12/1951 Johnson ................ B01F 7/1635
241/45
3,738,581 A * 6/1973 Gallauresi ........... B02C 18/0092
241/46.02

(Continued)

FOREIGN PATENT DOCUMENTS

CN       206716156       12/2017

*Primary Examiner* — Faye Francis
(74) *Attorney, Agent, or Firm* — Dentons US LLP

(57) ABSTRACT

The invention relates to macerator for processing a slurry, the macerator comprising an inlet configured to receive a flow of inlet slurry comprising particles having an average particle size of less than 20 mm, an outlet, two or more bodies that rotate relative to each other, each body comprising a plurality of apertures to define a flow path through each body, wherein the slurry traverses the flow path from the macerator inlet to the macerator outlet via the at least one aperture of each body to produce an outlet slurry.

14 Claims, 10 Drawing Sheets

(56) References Cited

U.S. PATENT DOCUMENTS

| | | | | |
|---|---|---|---|---|
| 4,008,882 | A * | 2/1977 | Jorgensen | B01F 7/00608 |
| | | | | 366/343 |
| 4,182,499 | A * | 1/1980 | Kemper | B02C 18/0092 |
| | | | | 241/166 |
| 4,275,849 | A | 6/1981 | Chambers | |
| 4,422,580 | A * | 12/1983 | Shepherd | F04D 29/2288 |
| | | | | 241/46.11 |
| 5,160,095 | A * | 11/1992 | Pepper | B02C 18/0092 |
| | | | | 241/236 |
| 7,284,716 | B2 * | 10/2007 | Nakano | B01F 3/0807 |
| | | | | 241/46.17 |
| 7,910,279 | B2 * | 3/2011 | Maezawa | G03G 9/08755 |
| | | | | 430/137.14 |
| 9,097,257 | B2 * | 8/2015 | Ovsthus | F04C 13/001 |
| 9,617,993 | B2 * | 4/2017 | Mehta | F04C 13/001 |
| 2010/0155514 | A1 * | 6/2010 | Partington | B02C 23/04 |
| | | | | 241/33 |
| 2017/0042403 | A1 | 2/2017 | Xu | |
| 2020/0222909 | A1 * | 7/2020 | Quinn | B02C 18/144 |

\* cited by examiner

PLASTIC PROCESSING APPARATUS AND RELATED METHODS

This application is a U.S. National Stage Application of International Application No. PCT/IB2019/060586 filed on Dec. 9, 2019, which claims priority to and the benefit of priority of New Zealand Patent Application No. 749067 filed on Dec. 7, 2018, all of which are hereby incorporated by reference in their entirety for all purposes as if fully set forth herein.

FIELD OF THE INVENTION

The present invention relates to an apparatus for, and a method of, processing an input material such as plastic. In particular, the present invention relates to the use of a macerator to micronise the input material, such as plastic.

BACKGROUND TO THE INVENTION

Plastic is a widely used material in both household and industrial items. Many countries are struggling to dispose or utilise the waste plastic in an economical and safe manner. The recycling of plastic into other goods is known, but requires energy and resources to wash the plastic, reduce it to a desired particle size from its original form and then re-utilise it in a recycled product.

It is an object of the present invention to provide a method of micronising a substrate, such as plastic, or to at least provide the public with a useful choice.

SUMMARY OF THE INVENTION

In a first aspect the invention relates to a macerator for processing a slurry, the macerator comprising:
an inlet, configured to receive a flow of slurry, the slurry comprising particles having a particle size of less than 20 mm,
an outlet,
two or more bodies, the bodies rotate relative to each other, each body comprising a plurality of apertures to define a flow path through each body, and
wherein the slurry traverses the flow path from the macerator inlet to the macerator outlet via the at least one aperture of each body to produce an outlet slurry.

In a first aspect the invention relates to a macerator for processing a slurry, the macerator comprising:
an inlet, configured to receive a flow of slurry, the slurry comprising particles having a particle size of less than 20 mm,
an outlet,
one or more pairs of bodies, the pair of bodies comprising an inner body and an outer body that rotate relative to each other, each body comprising a plurality of apertures to define a flow path through each body, and
wherein the slurry traverses the flow path from the macerator inlet to the macerator outlet via the at least one aperture of each body to produce an outlet slurry.

In a further aspect the invention relates to a macerator for processing a slurry, the macerator comprising:
an inlet, configured to receive a flow of slurry comprising particles of an input material,
an outlet,
two or more bodies, the bodies rotate relative to each other, each body comprising a plurality of apertures to define a flow path through each body, and
wherein the slurry traverses the flow path from the macerator inlet to the macerator outlet via the at least one aperture of each body to produce an outlet slurry.

In a further aspect the invention relates to a macerator for processing a plastic slurry, the macerator comprising:
an inlet, configured to receive a flow of slurry comprising plastic particles,
an outlet,
two or more bodies, the bodies rotate relative to each other, each body comprising a plurality of apertures to define a flow path through each body,
wherein the slurry traverses the flow path from the macerator inlet to the macerator outlet via the at least one aperture of each body to produce an outlet slurry.

In a further aspect the invention relates to a macerator for processing a plastic slurry, the macerator comprising:
an inlet, configured to receive a flow of slurry, the slurry comprising plastic particles having a particle size of less than 20 mm,
an outlet,
two or more bodies, the bodies rotate relative to each other, each body comprising a plurality of apertures to define a flow path through each body, and
wherein the slurry traverses the flow path from the macerator inlet to the macerator outlet via the at least one aperture of each body to produce an outlet slurry.

In a further aspect the invention relates to a method of processing a slurry comprising:
providing a macerator and optionally providing a refiner, the macerator having an inlet and an outlet, the macerator comprising two or more bodies, the bodies rotate relative to each other, each body comprising a plurality of apertures to define a flow path through each body, the inner and outer bodies being separated from each other by less than 60 µm, and each body comprising a plurality of apertures to define a flow path through each body,
if present, the refiner comprising an inner sheath, having a plurality of apertures, and an outer sheath about one side of the inner sheath to define an inlet between the inner and outer sheaths, and an outlet on the other side of the inner sheath to define a flow path from the inlet via the apertures to the outlet,
introducing a slurry to the macerator inlet, the slurry comprising particles having a particle size of less than 20 mm, wherein the slurry traverses the flow path from the macerator inlet to the macerator outlet via the apertures of each body to produce a slurry having a particle size, such that if the particle size is greater than about 0.5 to about 10 µm, or a predetermined particle size, the slurry is
 (i) directed to the macerator inlet or a macerator inlet of another macerator until the outlet slurry has a particle size of less than about 10 to about 0.5 µm, or a predetermined particle size,
 (ii) introduced to the refiner inlet to traverse the flow path via the inner sheath aperture to the refiner outlet, to produce a slurry having a particle size less than about 10 to about 0.5 µm, or a predetermined particle size, or
 (iii) a combination of (i) and (ii);
such that the method of processing produces a slurry comprising a particle size less than about 10 to about 0.5 µm, or a predetermined particle size.

In a further aspect the invention relates to a method of processing plastic comprising
providing a macerator and optionally providing a refiner,
the macerator having an inlet and an outlet, the macerator comprising two or more bodies, the bodies that rotate relative to each other, the inner and outer bodies being separated from each other by less than 60 µm, and each body comprising a plurality of apertures to define a flow path through each body, if present, the refiner comprising an inner sheath, having a plurality of apertures, and an outer sheath about one side of the inner sheath to define an inlet between the inner and outer sheaths, and an outlet on the other side of the inner sheath to define a flow path from the inlet via the apertures to the outlet, introducing a slurry to the macerator inlet, the slurry comprising plastic particles having a particle size of less than 20 mm, wherein the slurry traverses the flow path from the macerator inlet to the macerator outlet via the apertures of each body to produce a slurry having a plastic particle size, such that if the particle size is greater than about 0.5 to about 10 µm, or a predetermined particle size, the slurry is
 (i) directed to the macerator inlet or a macerator inlet of another macerator until the outlet slurry has a particle size of less than about 0.5 µm, or a predetermined particle size,
 (ii) introduced to the refiner inlet to traverse the flow path via the inner sheath aperture to the refiner outlet, to produce a plastic having a particle size less than about 10 to about 0.5 µm, or a predetermined particle size, or
 (iii) a combination of (i) and (ii);
 such that the method of processing produces a slurry comprising the particle a particle size less than about 10 to about 0.5 µm, or a predetermined particle size.

In a further aspect the invention relates to a method of processing a slurry comprising
 providing a macerator and optionally providing a refiner,
 the macerator having an inlet and an outlet, the macerator comprising two or more bodies, the bodies that rotate relative to each other, the pair of bodies comprising at least an inner body and an outer body that rotate relative to each other each body comprising a plurality of apertures to define a flow path through each body,
 introducing a slurry to the macerator inlet, wherein the slurry traverses the flow path from the macerator inlet to the macerator outlet via the apertures of each body to produce a slurry having a particle size.

In a further aspect the invention relates to a method of processing a plastic slurry comprising
 providing a macerator and optionally providing a refiner,
 the macerator having an inlet and an outlet, the macerator comprising two or more bodies, the bodies rotate relative to each other each body comprising a plurality of apertures to define a flow path through each body,
 introducing a slurry to the macerator inlet, wherein the slurry traverses the flow path from the macerator inlet to the macerator outlet via the apertures of each body to produce a slurry having a particle size.

In a further aspect the invention relates to a system for processing plastic comprising
 an inlet configured to receive a system inlet slurry comprising plastic particles,
 an outlet configured to deliver a system outlet slurry,
 a maceration stage, the maceration stage comprising one or more macerator, the one or more macerator being the macerator as described,
 wherein the system inlet slurry is provided to the maceration stage to produce the system outlet slurry.

In a further aspect the invention relates to a system for processing a slurry comprising
 an inlet configured to receive a slurry comprising particles, having a particle size, of an input material,
 an outlet configured to output slurry comprising particles with a smaller particle size than the particle size of the input material,
 a maceration stage, the maceration stage comprising one or more macerator, the one or more macerator being a macerator as described, and
 wherein the inlet slurry is provided to the maceration stage to produce the outlet slurry.

In a further aspect the invention relates to the use of the plastic to manufacture composite products that utilise the micronised plastic.

In a further aspect the invention relates to the use of the slurry to manufacture composite products that utilise the micronised particles.

In a further aspect the invention relates to a base ingredient as an emulsion, for use in the production of a composite plastic product, the base ingredient comprising
 a first component, being a slurry comprising plastic particles having a mean particle diameter of less than about 0.5, 1, 2, 3, 4, 5, 6, 7, 8, 9, 10, 11, 12, 13, 14, 15, 16, 17, 18, 19 or 20 µm, the plastic particles in the first component comprising 50 to 80% polyethylene and 20 to 50% of other plastics;
 a second component comprising at least 40% of a paper and a substrate, the substrate selected from wood, rubber, concrete or a combination thereof;
 wherein the first and second components are mixed to produce an emulsion.

In a further aspect the invention relates to a base ingredient as an emulsion, for use in the production of a composite plastic product, the base ingredient comprising
 a first component, being a slurry comprising plastic particles having a mean particle diameter of less than about 0.5, 1, 2, 3, 4, 5, 6, 7, 8, 9, 10, 11, 12, 13, 14, 15, 16, 17, 18, 19 or 20 µm, the plastic particles in the first component comprising 50 to 80% polyethylene and 20 to 50% of other plastics;
 a second component comprising at least 40% of a paper and a substrate, the substrate selected from wood, rubber, concrete or a combination thereof;
 wherein the first and second components are mixed to produce an emulsion.

Any one or more of the following embodiments may relate to any of the aspects described herein or any combination thereof.

Preferably the process produces particles having a mean particle size of less than 20, 19, 18, 17, 16, 15, 14, 13, 12, 11, 10, 9, 8, 7, 6, 5, 4, 3, 2 or 1 µm, and suitable ranges may be selected from between any of these values.

Preferably if present, the refiner comprising an inner sheath, having a plurality of apertures, and an outer sheath about one side of the inner sheath to define an inlet between the inner and outer sheaths, and an outlet on the other side of the inner sheath to define a flow path from the inlet via the apertures to the outlet.

Preferably the input material (in the slurry) is
 (i) directed to the macerator inlet or a macerator inlet of another macerator until the outlet slurry has a particle size of less than 0.5 µm, or a predetermined particle size,
 (ii) introduced to the refiner inlet to traverse the flow path via the inner sheath aperture to the refiner outlet, to produce a having a particle size less than 0.5 µm, or a predetermined particle size, or
 (iii) a combination of (i) and (ii);
 such that the method of processing produces a slurry comprising having a particle size less than 1 µm, or 0.5 µm, or a predetermined particle size.

Preferably the slurry comprising particles having a particle size of about 4, 5, 6, 7, 8, 9, 10, 11, 12, 13, 14, 15, 16, 17, 18, 19 or 20 mm, and suitable ranges may be selected from between any of these values.

In one embodiment the inner and outer bodies are separated from each other by about 20, 30, 40, 50, 60, 80, 90, 100, 110, 120, 130, 140, 150, 160, 170, 180, 190, 200 µm, and suitable ranges may be selected from between any of these values.

In another embodiment the inner and outer bodies are separated from each other by about 20, 25, 30, 35, 40, 45, 50, 55 or 60 µm, and suitable ranges may be selected from between any of these values.

Preferably the outlet is configured to provide a flow of outlet slurry comprising plastic particles having a particle size being less than the particle size of the plastic particles of the inlet slurry.

Preferably the outlet slurry of the macerator(s) has a plastic particle size being less than a predetermined plastic particle size. More preferably the predetermined particle size is less than 0.1, 0.2, 0.3, 0.4, 0.5, 0.6, 0.7, 0.8, 0.9, or 1 µm, and suitable ranges may be selected from between any of these values.

Preferably the apertures of the macerator(s) comprise one or more slots.

Preferably the slots are located vertically, and/or in a direction from the top of the body to the bottom of the body.

Preferably the slots are angled with respect to a vertical or axial axis of the body.

Preferably the slots of a) the inner body or inner sheath and b) the outer body or outer sheath are oriented relative each other non-orthogonally.

Preferably the slots are oriented on a common axis.

In one embodiment the width of the one or more slots is substantially constant.

In an alternate embodiment the slots vary in width from an outer surface of the body to an inner surface of each of the inner body and outer body.

Preferably the width of the slot at an outer surface is greater than a width of the slot at an inner surface of each of the inner body and outer body.

Preferably the width of the slot at an outlet surface of each of the inner body and outer body is greater than a width of the slot at a respective inlet surface of each body.

Preferably the width of the slot at an inner surface of each inner body and outer body is greater than a width of the slot at an outer surface of each body.

Preferably the slots of the outer body are wider than the slots of the inner body.

Preferably the slots of the outer body are about 10, 20, 30, 40, 50, 60, 70, 80, 90, 100, 110, 120, 130, 140, 150, 160, 170, 180, 190, 200, 210, 220, 230, 240, or 250% wider than the slots of the inner body, and suitable ranges may be selected from between any of these values.

Preferably the slots of the outer body are about 150, 160, 170, 180, 190 or 200% wider than the slots of the inner body, and suitable ranges may be selected from between any of these values.

Preferably at least one slot of the outer body comprises a projection from the outer surface of the outer body.

Preferably the projection from the outer surface of the outer body comprises a blade.

Preferably the projection from the outer surface of the outer body extends in the direction of rotation of the outer body at an acute angle relative to the outer surface of the outer body.

Preferably the projection extends at an angle of about 5, 10, 15, 20, 25 or 30 degrees, and suitable ranges may be selected from between any of these values.

Preferably the projection extends at an angle of about 15 degrees.

Preferably a or the width of the one or more slots is between about 1, 2, 3, 4, 5, 6, 7, 8, 9, 10, 11, 12, 13, 14, 15, 16, 17, 18, 19 or 20 mm, and suitable ranges may be selected from between any of these values.

Preferably the inner body is rotatable about an axial axis, and the outer body is stationary.

Preferably the outer body is rotatable about an axial axis, and the inner body is stationary.

Preferably the inner body and the outer body are rotatable about an axial axis.

Preferably the macerator comprises an inner body shaft, the inner body shaft configured to be coupled to one or more inner body to allow for rotation of one or more inner body relative to an axial axis of one or more inner body, optionally one or more inner body shaft being provided with high speed water cooled bearing.

Preferably the macerator comprises an outer body shaft, the one or more outer body shaft configured to be coupled to the one or more outer body to allow for rotation of the one or more outer body relative to an axial axis of the one or more outer body, optionally the one or more outer body shaft being provided with high speed water cooled bearing.

Preferably one or more of the inner body shaft and/or the outer body shaft, and coupled to at least one motor, the at least one motor configured to rotate the inner body shaft and/or the outer body shaft.

Preferably the inner body or the outer body is an inlet body configured to provide for an inlet flow path for the pair of bodies, and wherein the other of the inner body or the outer body is an outlet body configured to provide for an outlet flow path for the pair of bodies.

Preferably a width or other dimension, or largest dimension of the at least one aperture of the inlet body is greater than a width or other dimension, or largest dimension of the at least one aperture of the outlet body.

Preferably the macerator comprises one or more pairs of bodies, wherein the inner body and an outer body of at least one pair of said pairs of bodies are located concentrically with respect to each other.

Preferably the macerator comprises a plurality of pairs of bodies, wherein each pair of bodies is located concentrically with respect to each other pair of bodies.

Preferably the macerator comprises at least a first pair of bodies, and a second pair or bodies, optionally the macerator comprises a third pair or bodies, and optionally one or more further pairs of bodies.

Preferably the flow path from an inlet of the macerator to the outlet of the macerator is through the first pair of bodies, followed by the second pair or bodies, and optionally through the third pair or bodies, and optionally through said one or more further pairs of bodies.

Preferably the progression of the slurry through each pair of bodies is configured to progressively decrease a particle size of plastic in the slurry.

Preferably the first pair of bodies comprises an inlet body (being one of the inner body or the outer body) wherein a width or other dimension, or largest dimension of the apertures of the inlet body is about 20 mm, and an outlet body (being the other of the inner body and the outer body) wherein a width or other dimension, or largest dimension of the apertures of the outlet body is about 17 mm.

Preferably the second pair of bodies comprises an inlet body (being one of the inner body or the outer body) wherein a width or other dimension, or largest dimension of the apertures of the inlet body is about 17 mm, and an outlet body (being the other of the inner body and the outer body)

wherein a width or other dimension, or largest dimension of the apertures of the outlet body is about 12 mm.

Preferably the third pair of bodies comprises an inlet body (being one of the inner body or the outer body) wherein a width or other dimension, or largest dimension of the apertures of the inlet body is about 12 mm, and an outlet body (being the other of the inner body and the outer body) wherein a width or other dimension, or largest dimension of the apertures of the outlet body is about 3 mm.

Preferably the flow path from the macerator inlet to the macerator outlet is provided through the apertures of each body of each pair of bodies.

Preferably the flow path from the macerator inlet to the macerator outlet is provided from an innermost body to an outermost body via each intermediate body.

Preferably the flow path from the macerator inlet to the macerator outlet is provided from an outermost body to an innermost body via each intermediate body.

Preferably the flow of inlet slurry is provided to internal surface of the inner body and/or an internal surface of the inner body of the innermost pair of bodies.

Preferably the flow of inlet slurry is provided to external surface of the outer body and/or an external surface of the outer body of the outermost pair of bodies.

Preferably the inlet slurry comprises plastic particles having a particle size of about 5, 6, 7, 8, 9, 10, 11, 12, 13, 14, 15, 16, 17, 18, 19 or 20 mm, and suitable ranges may be selected from between any of these values.

Preferably the outlet slurry comprises plastic particles having a particle size of less than about 0.5, 1, 2, 3, 4, 5, 6, 7, 8, 9, 10, 11, 12, 13, 14, 15, 16, 17, 18, 19 or 20 μm, and suitable ranges may be selected from between any of these values.

Preferably the outlet slurry comprises plastic particles having a plastic particle size, wherein the plastic particle size is less than a predetermined plastic particle size.

Preferably the plastic particle size is greater than the predetermined plastic particle size the outlet slurry is directed to the macerator inlet, and/or to a macerator inlet of another macerator until the outlet slurry has a particle size of less than the predetermined particle size.

Preferably the rotation of the inner body relative to the outer body applies a shear stress to the plastic particles.

Preferably the inlet slurry comprises at least one liquid.

Preferably the outer body and outer body are arranged concentrically.

Preferably the system comprises a plurality of macerators.

Preferably the system comprises 2, 3, 4, 5, 6, 7 or 8 macerators arranged in series, and suitable ranges may be selected from between any of these values.

Preferably the system comprises 2, 3, 4, 5, 6, 7 or 8 macerators arranged in parallel, and suitable ranges may be selected from between any of these values.

Preferably the outlet slurry of one of the one or more macerators is configured to be directed to the inlet of another of the one or more macerators, and/or to the inlet of the same macerator.

Preferably the system comprises at least a first macerator, and a second pair macerator, optionally the system comprises a third macerator, and optionally one or more further macerators.

Preferably a flow path is provided from the inlet of the system to the outlet of the system via the first macerator, followed by the second macerator, and optionally followed by the third macerator, and optionally followed by one or more further macerators.

Preferably the first macerator comprises an inlet body (being one of the inner body or the outer body) wherein a width or other dimension, or largest dimension of the apertures of the inlet body is about 20 mm, and an outlet body (being the other of the inner body and the outer body) wherein a width or other dimension, or largest dimension of the apertures of the outlet body is about 17 mm.

Preferably the second macerator comprises an inlet body (being one of the inner body or the outer body) wherein a width or other dimension, or largest dimension of the apertures of the inlet body is about 17 mm, and an outlet body (being the other of the inner body and the outer body) wherein a width or other dimension, or largest dimension of the apertures of the outlet body is about 12 mm.

Preferably the third macerator comprises an inlet body (being one of the inner body or the outer body) wherein a width or other dimension, or largest dimension of the apertures of the inlet body is about 12 mm, and an outlet body (being the other of the inner body and the outer body) wherein a width or other dimension, or largest dimension of the apertures of the outlet body is about 3 mm.

Preferably the rotation of the outer body relative the inner body comprises a rotation of the outer body on an outer body rotational axis, and the outer body comprises a body having a substantially circular cross-section along the outer body rotational axis.

Preferably the rotation of the inner body relative the outer body comprises a rotation of the inner body on an inner body rotational axis, and the inner body comprises a body having a substantially circular cross-section along the inner body rotational axis.

Preferably each of the inner body and outer body have a substantially circular cross-section along their respective inner body rotational axis and outer body rotational axis.

Preferably the outer body rotational axis is the same as the inner body rotational axis, such that the rotation of the outer body and inner body are concentric.

Preferably the inner body comprises one of a) a frusto-conical body, b) a conical body, and b) a cylindrical body.

Preferably the outer body comprises one of a) a frusto-conical body, b) a conical body, and b) a cylindrical body.

Preferably each of the inner body and the outer body comprise one of a) a frusto-conical body, b) a conical body, and b) a cylindrical body.

Preferably the flow rate of the solvent through the macerator about 10, 20, 30, 40, 50, 60, 70, 80, 90, 100, 200, 300, 400, 500, 600, 700, 800, 900, or 1,000 litres per minute, and suitable ranges may be selected from between any of these values.

Preferably the flow rate of the solvent through the macerator is about 80, 90, 100, 100, or 120 litres per minute.

Preferably the ratio of carrier solvent (such as water) to material in the inlet slurry is about 1 L of solvent to about 0.5 Kg of material, to about 0.5 L of solvent to about 1 Kg of material, and suitable ranges may be selected from between any of these values.

Preferably the slurry comprises about 10, 15, 20, 25, 30, 35, 40, 45, or 50% by weight of material (such as plastic), and suitable ranges may be selected from between any of these values.

Preferably the ratio of carrier solvent (such as water) to plastic provided to the macerator is at a ratio of approximately 1 L of carrier solvent to about 1 Kg of plastic.

Preferably the system outlet slurry comprises plastic particles having a plastic particle size, wherein the plastic particle size is less than a predetermined plastic particle size.

Preferably the plastic particle size is greater than the predetermined plastic particle size the outlet slurry of one or the plurality of macerators is directed to the macerator inlet, and/or to a macerator inlet of another macerator until the outlet slurry has a particle size of less than the predetermined particle size.

Preferably the inlet slurry is recycled through the maceration stage until the outlet slurry has a particle size of less than the predetermined particle size.

Preferably the system further comprises an agitation stage, the agitation stage located before the maceration stage, wherein system inlet slurry is provided to an inlet of the agitation stage, and an outlet of the agitation stage provides the agitated slurry to the maceration stage.

Preferably the agitator comprises a vessel comprising a stirrer, the stirrer configured to agitate the system inlet slurry within the vessel to produce agitated slurry.

Preferably the agitator comprises one or more baffles, the one of more baffles extending from a wall of the vessel.

Preferably the system further comprises a refining stage, the refining stage comprising at least one refiner, the refining stage being located after the maceration stage to receive the macerated slurry from the maceration stage.

Preferably wherein the refiner comprises an inner sheath, having a plurality of apertures, and an outer sheath about one side of the inner sheath to define an inlet between the inner and outer sheaths, and an outlet on the other side of the inner sheath to define a flow path from the inlet via the apertures to the outlet, Preferably the refiner wherein the inner sheath and outer sheath are conical.

Preferably the inner sheath is a substantially continuous surface.

Preferably the outer sheath comprises a mesh material.

Preferably the inner sheath is or comprises a mesh or grid-type material, and the outer sheath has a substantially continuous surface.

Preferably the spacing between the inner sheath and outer sheath is substantially constant.

Preferably the spacing between the inner sheath and outer sheath is less than 10 mm.

Preferably the spacing between the inner sheath and outer sheath is less than about 5.0, 4.5, 4.0, 3.5, or 3.0 mm, and suitable ranges may be selected from between any of these values.

Preferably the spacing between the inner sheath and outer sheath is about 1 to about 2 mm, and suitable ranges may be selected from between any of these values.

Preferably, if a particle is greater than about 0.5 μm, or a predetermined particle size, the slurry is
  (i) directed to the macerator inlet or a macerator inlet of another macerator until the system outlet slurry has a particle size of less than a predetermined plastic particle size, or
  (ii) introduced to the refiner inlet to traverse the flow path via the inner sheath aperture to the refiner outlet, to produce a plastic having a particle size less than a predetermined plastic particle size, or
  (iii) a combination of (i) and (ii).

Preferably the system further comprises an emulsification stage, optionally the emulsification stage located subsequent to the refining and maceration stages.

Preferably the system further comprises a pre-processing stage, wherein the pre-processing stage is configured to generate particles for the inlet slurry from raw material.

Preferably the pre-processing stage comprises a granulator.

Preferably the pre-processing stage is configured to generate a slurry having a particle size of about 5, 6, 7, 8, 9, 10, 11, 12, 13, 14, 15, 16, 17, 18, 19 or 20 mm, and suitable ranges may be selected from between any of these values.

Preferably the system further comprises a water cooling system configured to cool the macerator, and emulsion units, optionally cooling any bearings.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7).

This invention may also be said broadly to consist in the parts, elements and features referred to or indicated in the specification of the application, individually or collectively, and any or all combinations of any two or more of said parts, elements or features, and where specific integers are mentioned herein which have known equivalents in the art to which this invention relates, such known equivalents are deemed to be incorporated herein as if individually set forth.

In this specification, where reference has been made to external sources of information, including patent specifications and other documents, this is generally for the purpose of providing a context for discussing the features of the present invention. Unless stated otherwise, reference to such sources of information is not to be construed, in any jurisdiction, as an admission that such sources of information are prior art or form part of the common general knowledge in the art.

The term "comprising" as used in this specification means "consisting at least in part of". When interpreting statements in this specification which include that term, the features, prefaced by that term in each statement, all need to be present but other features can also be present. Related terms such as "comprise" and "comprised" are to be interpreted in the same manner.

BRIEF DESCRIPTION OF THE DRAWINGS

The invention will now be described by way of example only and with reference to the drawings in which:

FIG. 1 shows a view of a macerator having a pair of bodies, where the bodies are of a cylindrical form.

DETAILED DESCRIPTION OF THE INVENTION

Figure 1A:
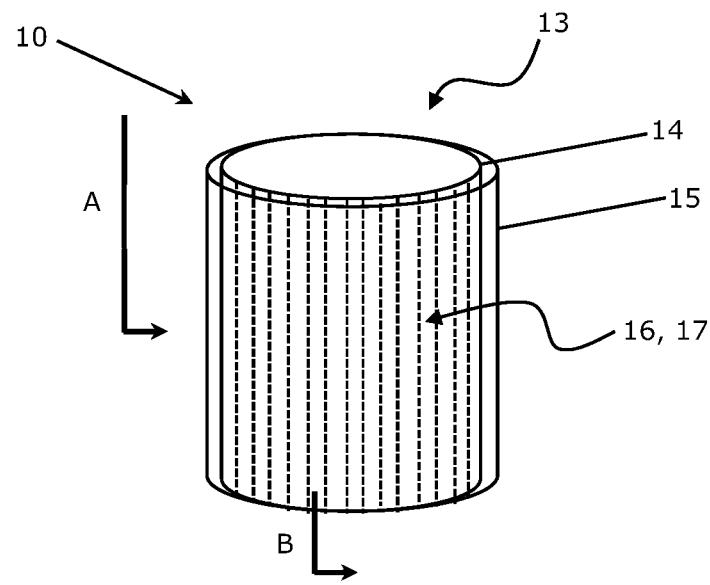
FIG. 1A shows a cross-sectional view of a macerator having a vertical axis of rotation.

Disclosed is a system, method and apparatus for processing an input material (for example plastics). The system, method and apparatus may be used for processing the input material (for example plastics) to a micron particle size. The processed input material may be part of a slurry, the slurry comprising the input material particles and one or more liquids.

As used herein, the term "slurry" refers to a mixture of a solid particle suspended in, or as part of a mixture containing a liquid. Preferably the slurry comprises about 10, 20, 30, 40, 50, or 60% solid particles. In some embodiments the slurry is a homogeneous dispersion of particles suspended in a liquid phase.

The term particle size in the specification is used to describe an average size of the particle and/or a maximum dimension of a particle. It will be appreciated that when the term particle size in reference to the size of a particle in the slurry, it may be that not every single particle in the slurry may have such a particle size, instead it may be a substantial amount of the particles.

The system, method and apparatus may be used for the processing a variety of input plastics.

Although the specification refers to the processing of plastic, it will be appreciated that the system, method and apparatus may be used for the processing a variety of input slurries with different input materials and/or particle types.

1. Source of Input Material

The input material provided in the inlet slurry may be any material in which it is desired to micronize.

For example, the solid material may be plastic. The plastic could be obtained from any plastic source.

Waste plastic provides a useful source of plastic for this process. In many countries waste plastic creates an environmental problem as society struggles to recycle or dispose of such plastic economically and safely. The input waste plastics may be for example the type of plastics derived from the waste recycling process. However, it will be appreciated various types of input plastic may be used depending on the desired output slurry.

The waste plastic can be a mixture of any of polyethylene terephthalate (PETE or PET), high-density polyethylene (HDPE), polyvinyl chloride (PVC), low-density polyethylene (LDPE), polypropylene (PP), polystyrene or styrofoam (PS), polycarbonate, polylactide, acrylic, acrylonitrile butadiene, styrene, fiberglass, rubber, paper and nylon). This waste plastic mixture may for example originate from a comingled plastic waste stream.

Given the wide use of plastic in society, the waste plastic is typically sourced from every-day waste products such as plastic bottles (e.g. milk, carbonated drinks, water bottles, cleaning products), plastic containers (e.g. for industrial products such as oil, food items), and packaging (whether rigid or soft), although it will be appreciated that the product list of waste products is immensely broad.

Preferably the input plastic is first processed to reduce its size to a particle size of less than about 5, 6, 7, 8, 9, 10, 11, 12, 13, 14, 15, 16, 17, 18, 19 or 20 mm, and suitable ranges may be selected from between any of these values, (for example, about 5 to about 20, about 5 to about 18, about 5 to about 12, about 5 to about 10, about 5 to about 9, about 6 to about 20, about 6 to about 19, about 6 to about 17, about 6 to about 14, about 6 to about 10, about 6 to about 8, about 7 to about 20, about 7 to about 16, about 7 to about 13, about 7 to about 11, about 7 to about 8, about 8 to about 20, about 8 to about 17, about 8 to about 14, about 8 to about 10, about 9 to about 20, about 9 to about 15, about 9 to about 12, about 10 to about 20, about 10 to about 17, about 10 to about 14, about 11 to about 20, about 11 to about 17, about 11 to about 14, about 12 to about 20, about 12 to about 15, about 13 to about 20, about 13 to about 18, about 14 to about 20, about 14 to about 19, about 15 to about 20 or about 15 to about 17 mm).

Various methods are known to reduce the original plastic products to a particle size as described above. For example, the use of cutting and/or extruders, shredders, granulators or grinders. Cutting and extruding machines (e.g. see U.S. Pat. No. 9,744,689) can include one or more knives that rotate in a housing such that any plastic introduced into the housing is cut by the knives into smaller particles. In some machines the plastic may start to melt, or melt, due to the action of the knives (i.e. by the heat produced by friction) and such melted or partially melted plastic may enter an extruder in which the screws carry the plastic away from the cutting blades. The plastic may then be extruded and cut into small pallets at the outlet of the extruder.

Shredders (e.g. see U.S. Pat. No. 6,241,170), granulators (e.g. see U.S. Pat. No. 6,749,138) and grinders (e.g. see U.S. Pat. No. 5,547,136 or German patent DE 19614030 A1) may include a single or plurality of cutting wheels or rollers that again rotate in a housing and reduce the size of the plastic through the action of the cutting wheel or rollers against the plastic as the plastic passes between the cutting wheels or roller and the internal surface of the housing. Alternately, the plastic may pass between two or more banks of knives or rollers, that in some cases overlap, such that the plastic is cut or ground due to this passage, Such processes typically use rotary knives or bed knives whose rotation cuts the plastic into smaller particles or pieces.

The inlet or input slurry may comprise one or more liquids (solvents). In some embodiments the liquid is selected from water or methyl chloride, or a combination thereof.

In some embodiments the ratio of liquid to plastic by weight of the inlet slurry is 0.1:1, 0.2:1, 0.3:1, 0.4:1, 0.5:1, 0.6:1, 0.7:1, 0.8:1, 0.9:1, 1:1, 1:0.1, 1:0.2, 1:0.3. 1:0.4, 1:0.5, 1:0.6, 1:0.7, 1:0.8, or 1:0.9, and suitable ranges may be selected from between any of these values.

2. Agitation Stage

The agitator receives solid material (such as plastic) having a particle size of about 5, 6, 7, 8, 9, 10, 11, 12, 13, 14, 15, 16, 17, 18, 19 or 20 mm as described above, and suitable ranges may be selected from between any of these values (for example, about 5 to about 20, about 5 to about 18, about 5 to about 14, about 5 to about 10, about 5 to about 8, about 6 to about 20, about 6 to about 17, about 6 to about 15, about 6 to about 10, about 6 to about 8, about 7 to about 20, about 7 to about 18, about 7 to about 15, about 7 to about 12, about 7 to about 9, about 8 to about 20, about 8 to about 18, about 8 to about 16, about 8 to about 15, about 8 to about 13, about 8 to about 12, about 9 to about 20, about 9 to about 15, about 9 to about 13, about 10 to about 20, about 10 to about 16, about 10 to about 14, about 11 to about 20, about 11 to about 18, about 11 to about 15, about 12 to about 20, about 12 to about 17, about 12 to about 15, about 13 to about 20, about 13 to about 19, about 13 to about 16 or about 14 to about 20 mm).

In some embodiments the agitator receives material having a homogenous or semi-homogenous particle size. For example, the agitator may receive material having a particle size of approximately 8 mm. In another embodiment the particle size of the material has a size distribution whereby at least 90, 91, 92, 93, 94 or 95% of the material has a mean particle diameter of 5, 6, 7, 8, 9, 10, or 11 mm, and suitable ranges may be selected from between any of these values (for example, about 5 to about 11, about 5 to about 9, about 5 to about 8, about 6 to about 11, about 6 to about 10, about 6 to about 8, about 7 to about 11, about 7 to about 10, about 7 to about 8 or about 8 to about 11 mm).

In various embodiments, the particle size of the input material has a particle size distribution whereby at least 90% of the particles have a diameter of about 5, 6, 7, 8, 9, 10 or 11 mm. In one embodiment, the invention relates to a population of material particles wherein at least 90% of the particles have a diameter within 1 mm of the mean diameter of the population.

In some embodiments the agitator is in the form of a vessel or tank that includes a stirrer having at least one blade on its end.

The system inlet slurry is provided to an inlet of the agitation stage 60, and an outlet of the agitation stage 60 provides the agitated slurry to the maceration stage.

The agitator stage 60 may comprises a vessel 61 comprising a stirrer 62. The stirrer 62 may be configured to agitate the system inlet slurry within the vessel 61 to produce agitated slurry. Preferably the stirrer creates a vortex within the vessel. Without wishing to be restrained by theory, the vortex assists in keeping the waste plastic particles suspended in the vessel, to prevent the waste plastic from settling at the bottom of the vessel.

Alternatively, where the density of the waste plastic is less than the density of the carrier liquid, the plastic may at least partially float within the vessel. In such a configuration, the stirrer may preferably create a vortex or flow within the vessel to draw the plastic from floating in the vessel downwards to an outlet of the vessel to the macerator 10.

The stirrer preferably creates a homogeneous mix of plastic and solvent such as water within the vessel.

The stirrer of the agitator preferably operates at a rotational rate that achieves substantial homogeneity of the material within the slurry. By "substantial", this means at least 70, 75, 80, 85, 90 or 95% homogeneity. Without wishing to be bound by theory, this degree of homogeneity is sufficient to achieve the desired input feed rate of the material to the macerator 10, without the macerator jamming. For example, the stirrer may be operated at speeds of approximately 100 RPM to approximately 5,000 RPM.

In some forms, the stirrer may increase in operational speed over the processing of a fixed quantity of plastic from the vessel. For example, if the mass or volume of plastic relative to the volume of solvent in the vessel decreases over the operation of the process, the operational speed of the of the stirrer may be increased in order to maintain a constant, or substantially constant, flow rate of plastic from the outlet of the vessel and to the macerator 10. For example, the stirrer may begin at approximately 2,000 RPM, and be increased to approximately 5,000 RPM by the end of processing of a fixed quantity of plastic from the agitator.

In addition or alternative, in some forms the operational speed of the stirrer may be controlled dependent on the size, or average size, of the plastic particles within the vessel.

In some embodiments the agitator comprises one or more baffles 53, the one of more baffles extending from an inner wall of the vessel. Without wishing to be bound by theory, the baffles may act to retain the plastic particles to the centre of the vessel.

The stirrer may act to further reduce the particle size of the plastic.

In some embodiments a plate is located above the stirrer. The plate has a diameter about equal to the diameter of the stirrer blades. Preferably the diameter of the blade is 80, 95, 90, 95, 100, 105, 110, 115 or 120% the diameter of the stirrer blade, and suitable ranges may be selected from between any of these values.

In some embodiments the waste plastic from the outlet of the agitation stage has a particle size of 0.5, 1.0, 1.5, 2.0, 2.5, 3.0, 3.5 or 4.0 mm, and suitable ranges may be selected from between any of these values, (for example, about 0.5 to about 4.0, about 0.5 to about 3.0, about 0.5 to about 2.5, about 0.5 to about 1.5, about 1.0 to about 4.0, about 1.0 to about 3.5, about 1.0 to about 2.5, about 1.5 to about 4.0, about 1.5 to about 3.5, about 1.5 to about 2.5, about 2.0 to about 4.0, about 2.0 to about 3.5, about 2.0 to about 3.0, about 2.5 to about 4.0, about 2.5 to about 3.5, about 2.5 to about 3.0, or about 3.0 to about 4.0 mm).

The plastic enters the inlet of the agitator as a slurry as described. The liquid, that forms the slurry with the plastic particles, can be water or a solvent or a combination thereof.

Suitable solvents to form the slurry include a haloalkane (for example methyl chloride).

In some embodiments the agitator is operated for at least 1, 2, 3, 4, 5, 6, 7, 8, 9, 10 min, and suitable ranges may be selected from between any of these values.

In some embodiments the agitator is run as a continuous process, with the slurry exiting the outlet of the agitator with plastic particles that have reached a particle size of less than 0.5, 1.0, 1.5, 2.0, 2.5, 3.0, 3.5 or 4.0 mm, and suitable ranges may be selected from between any of these values, (for example, about 0.5 to about 4.0, about 0.5 to about 3.0, about 0.5 to about 2.5, about 0.5 to about 1.5, about 1.0 to about 4.0, about 1.0 to about 3.5, about 1.0 to about 2.5, about 1.5 to about 4.0, about 1.5 to about 3.5, about 1.5 to about 2.5, about 2.0 to about 4.0, about 2.0 to about 3.5, about 2.0 to about 3.0, about 2.5 to about 4.0, about 2.5 to about 3.5, about 2.5 to about 3.0, or about 3.0 to about 4.0 mm).

This particle size selection can be achieved through the use of a particle size selector on the outlet pipe, such as a mesh having a mesh size that allows plastic particles below a desired size through. The stirrer acts to prevent build-up of larger-sized plastic particles about the size selector at the outlet.

3. Macerator

Figure 1B:
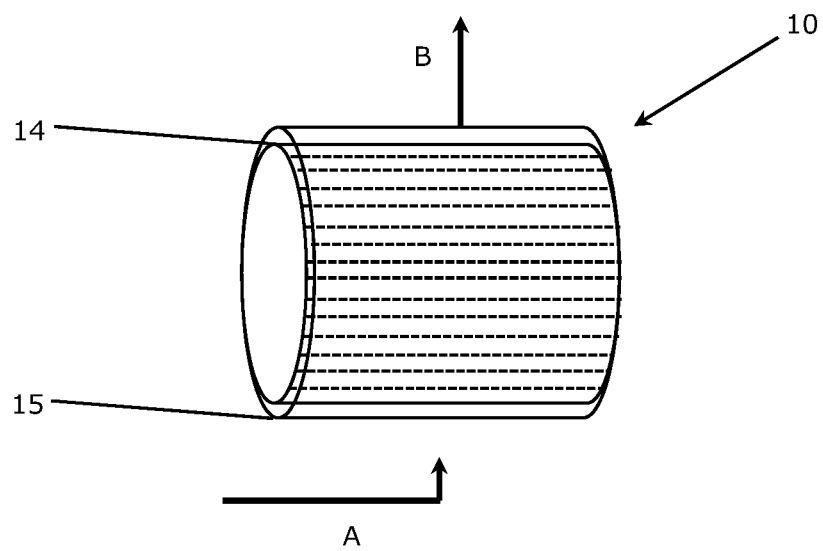
FIG. 1B shows a cross-sectional view of a macerator having a horizontal axis of rotation.
Figure 1C:
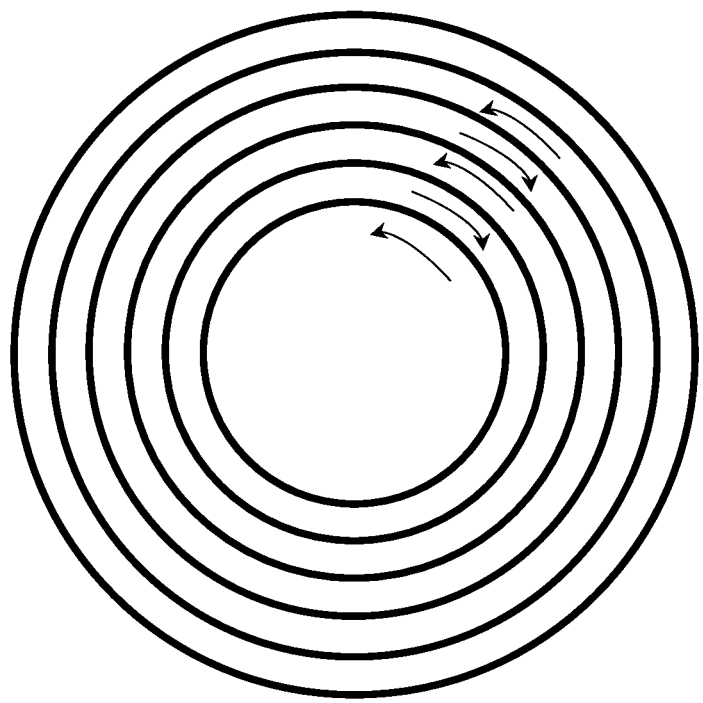
FIG. 1C shows a top view of a macerator having six bodies, and the arrows showing their direction of rotation.
Figure 1D:
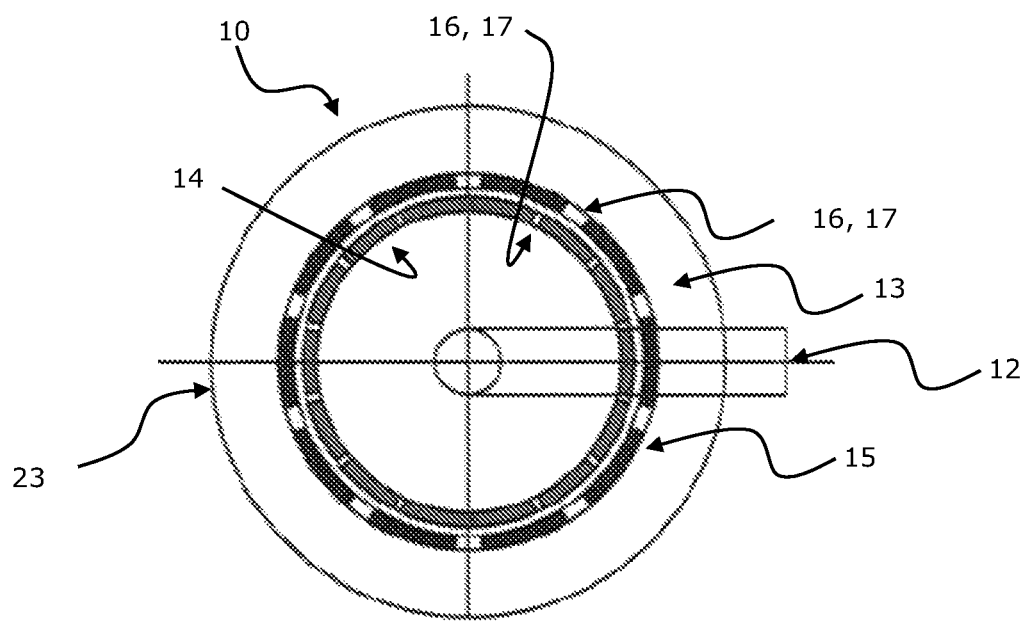
FIG. 1D shows a view of a macerator having a housing.
Figure 1E:
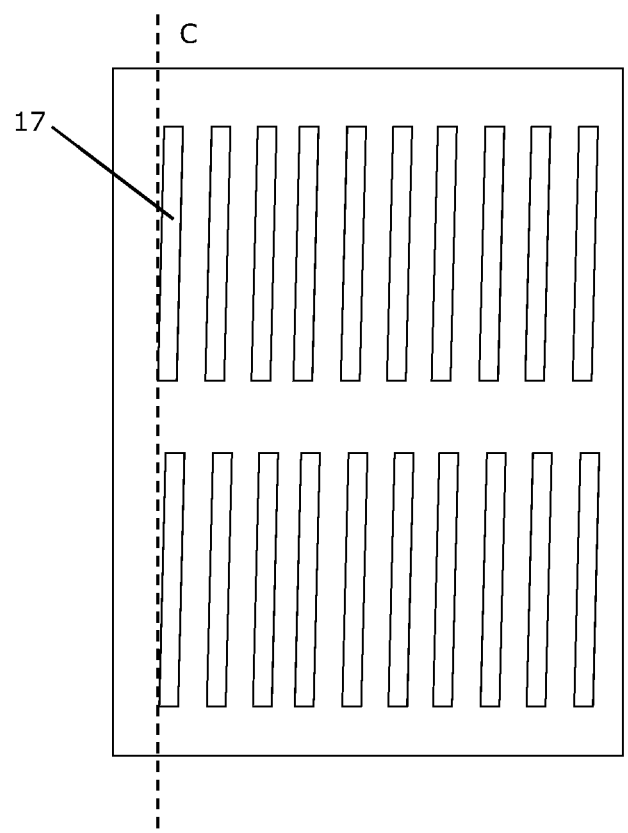
FIG. 1E shows a side view of a macerator having a vertical axis of rotation.
Figure 1F:
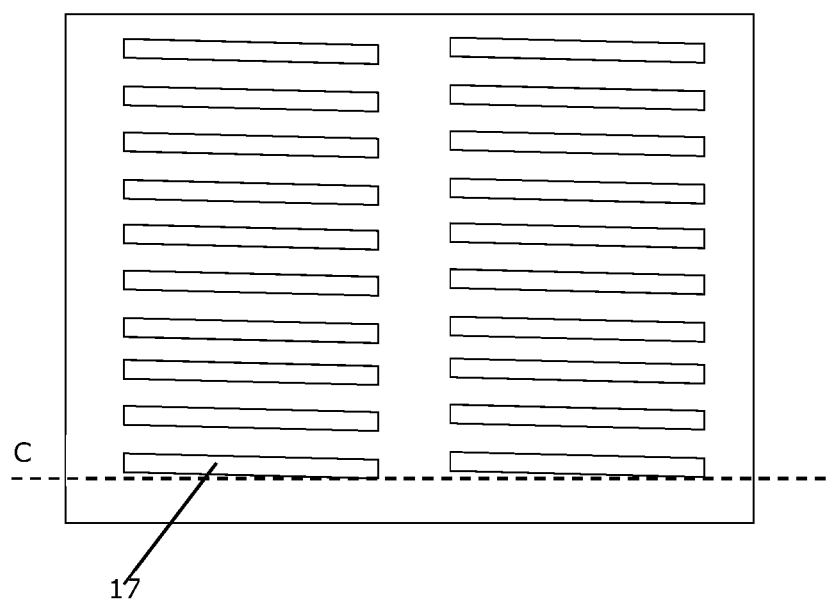
FIG. 1F shows a side sectional view of a macerator having a horizontal axis of rotation.
Figure 1G:
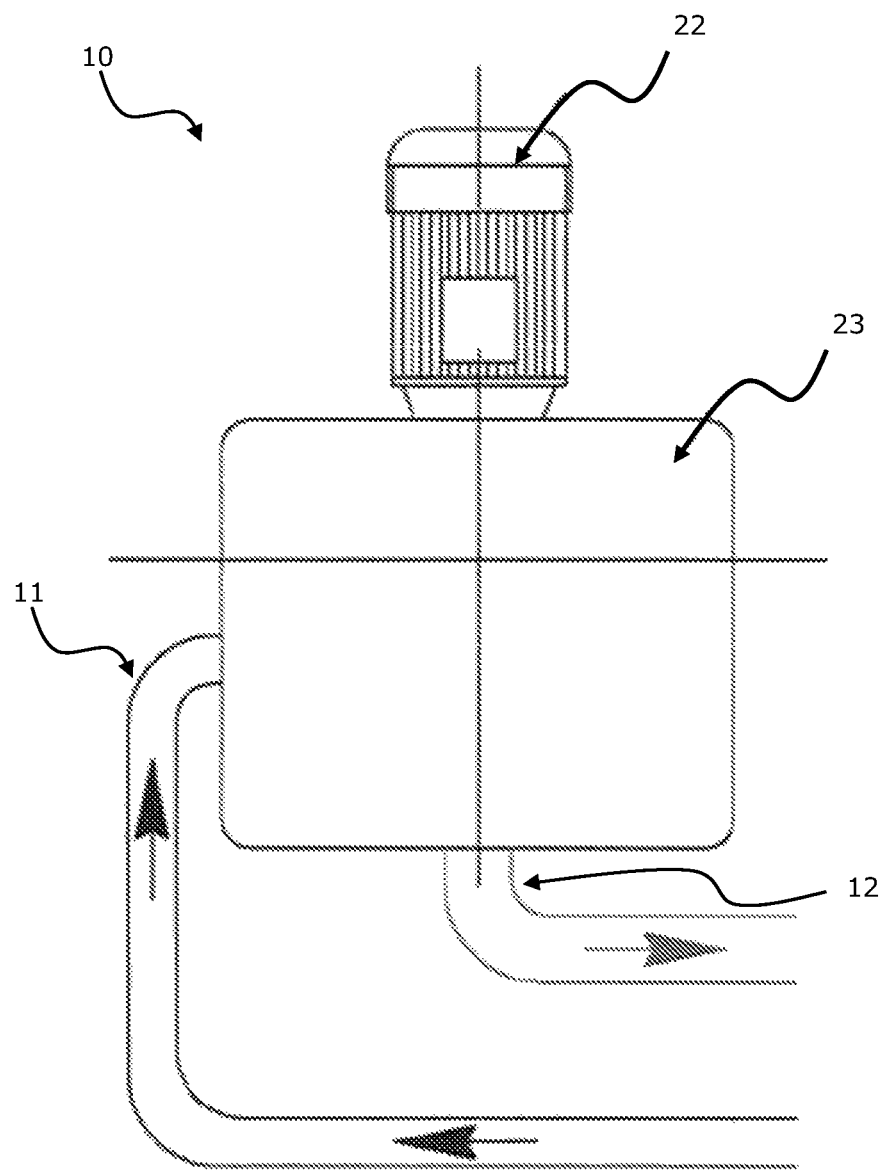
FIG. 1G shows a cross-sectional view of a macerator.
Figure 2:
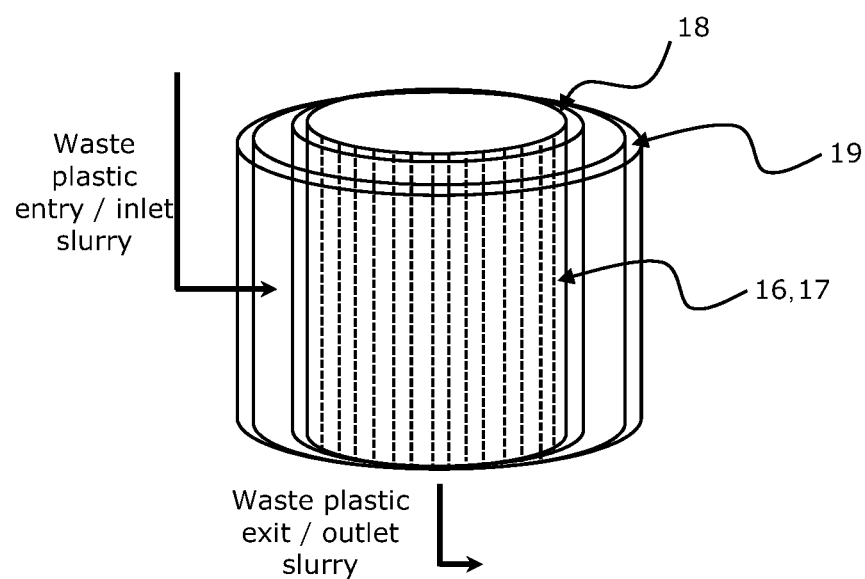
FIG. 2 shows a view of a macerator having a first pair of bodies and a second pair of bodies.
Figure 3:
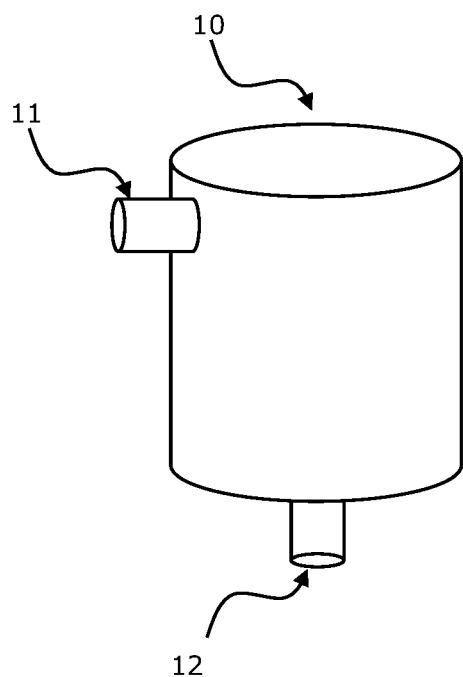
FIG. 3 shows an external view of a macerator.
Figure 4:
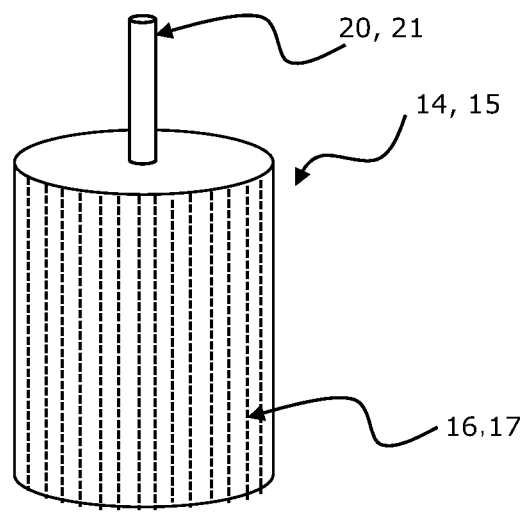
FIG. 4 shows a cylindrical body of a macerator.
Figure 5:
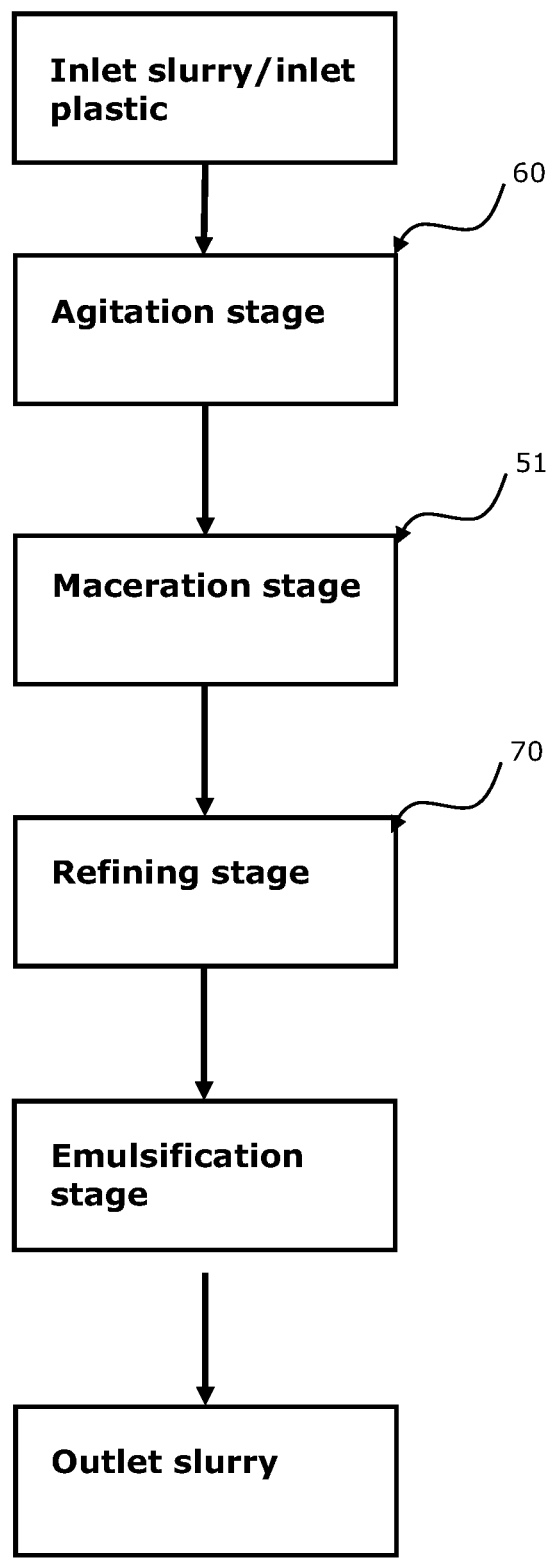
FIG. 5 shows a diagram of the system and/or method of processing plastic.
Figure 6:
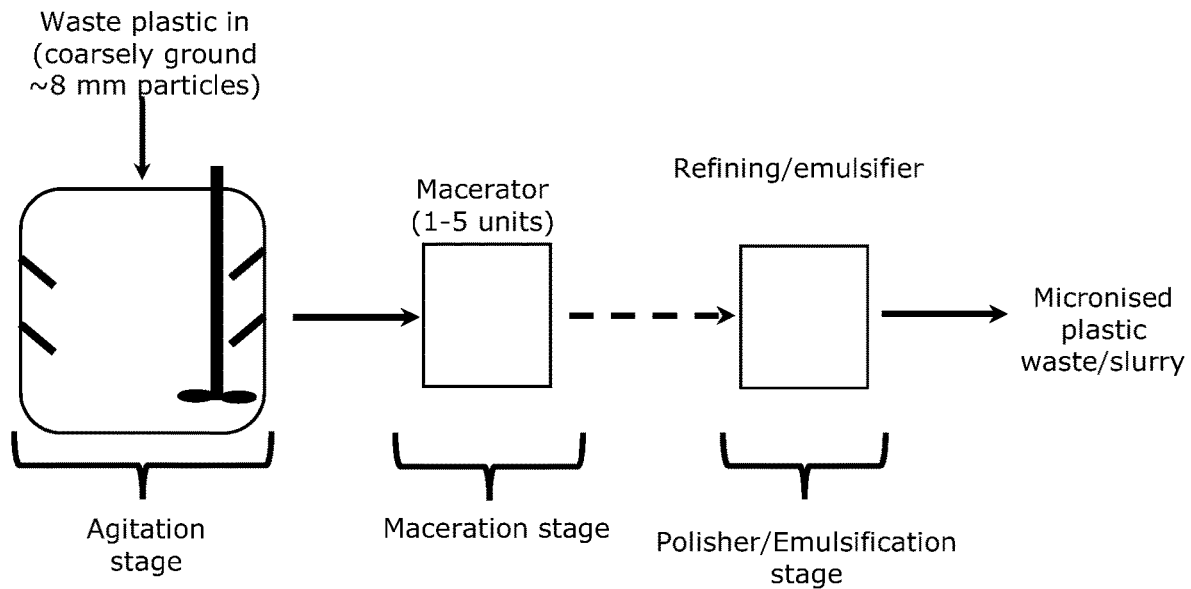
FIG. 6 shows a diagram of a system of processing plastic.
Figure 7:
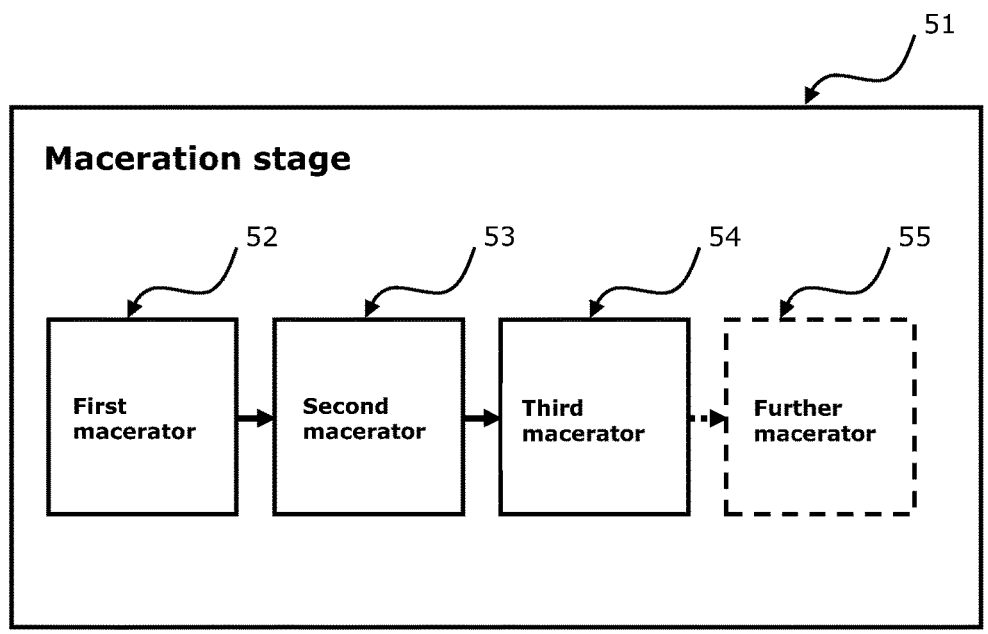
FIG. 7 shows a maceration stage having a plurality of macerators.
Figure 8:
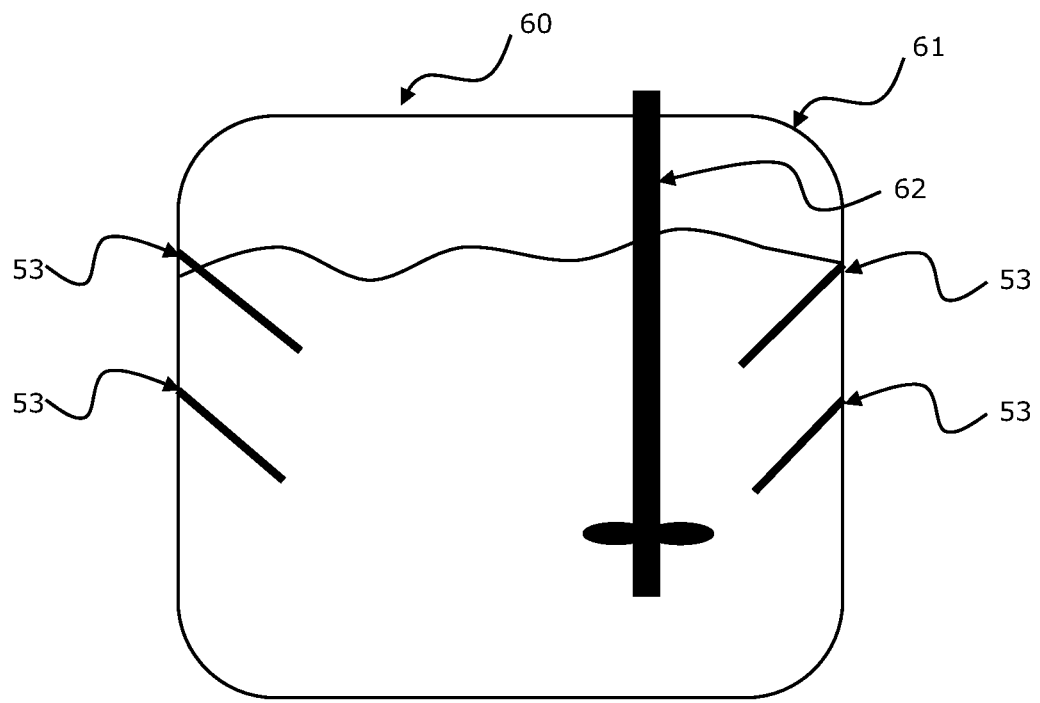
FIG. 8 shows an agitation stage.
Figure 9:
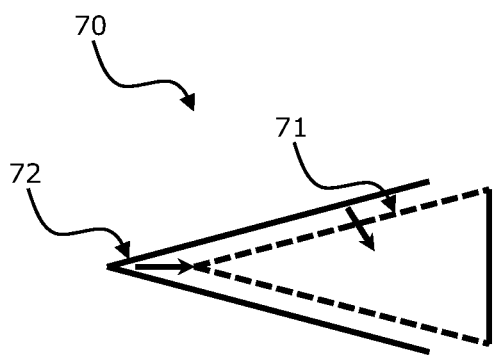
FIG. 9 shows a refiner.

The process includes the use of one or more macerators 10, for example as shown in FIGS. 1 to 3. The macerator 10 may form part of the system or method as described herein. The macerator 10 may comprising, an inlet 11. The inlet 11 may be configured to receive a flow of inlet slurry comprising plastic particles. The macerator 10 may also comprise an outlet 12. The outlet 12 may be configured to provide the outlet slurry from the macerator 10.

The macerator 10 comprises two or more bodies 13, either as a pair of bodies, or a plurality of bodies in stacked relationship. The bodies 13 therefore comprise at least an inner body 14 and an outer body 15. Each adjacent body such as an inner body 14 and an outer body 15 rotate relative to each other. For example, one body may be fixed, and the adjacent body rotate, or both bodies may rotate in an opposite directions to each other.

As shown in FIGS. 1A and 1B is a macerator comprising a single pair of bodies 14 (inner) and 15 (outer). The plastic is inlet at "A" and outlets at "B". Alternately the macerator can have more than two bodies as shown in FIG. 1C. FIG. 1C is a top view of a macerator having six bodies. Shown by the arrows in FIG. 1C is the direction of travel of each body. Starting with the outer most body, shown is that it remains static, that is, it does not rotate. The second body rotates anti-clockwise. In one embodiment the outer most body may rotate counter to the second body—so clockwise in this example. The third body rotates clockwise and the next body rotates counter clockwise etc.

The inner body 14 and the outer body 15 rotate relative to each other at a rotational speed of about 100, 150, 200, 250, 300, 350, 400, 450, 500, 550, 600, 650, 700, 750, 800, 850, 900, 950 or 1,000 RPM, and suitable ranges may be selected from between any of these values, (for example, about 100 to about 1000, about 100 to about 900, about 100 to about 700, about 100 to about 600, about 100 to about 500, about 200 to about 1000, about 200 to about 800, about 200 to about 700, about 200 to about 600, about 200 to about 500, about 200 to about 400, about 300 to about 1000, about 300 to about 900, about 300 to about 700, about 300 to about 600, about 300 to about 500, about 300 to about 400, about 400 to about 1000, about 400 to about 700, about 400 to about 600, about 400 to about 500, about 500 to about 1000, about 500 to about 900, about 500 to about 700, about 500 to about 600, about 600 to about 1000, or about 600 to about 700 RPM).

More preferably, the inner body 14 and the outer body 15 rotate relative to each other at a rotational speed of about 500, 520, 540, 560, 580, 600, 620, 640, 660, 680 or 700 RPM, and suitable ranges may be selected from between any of these values, (for example, about 500 to about 700, about 500 to about 660, about 500 to about 600, about 520 to about 700, about 520 to about 640, about 540 to about 700, about 540 to about 660, about 540 to about 600, about 560 to about 700, about 560 to about 660, about 560 to about 620, about 580 to about 700, about 580 to about 660, about 580 to about 620, about 600 to about 700, about 600 to about 680, about 600 to about 640, about 620 to about 700, about 620 to about 680, about 640 to about 700 RPM).

The speed of relative rotation of the inner body 14 and outer body 15 may be provided dependent on one or more other variables, such as for example the feed rate of plastic and carrier solvent to the macerator 10, the proportion of plastic to carrier solvent in the inlet feed, the type of carrier solvent, the maximum particle size of inlet plastic, the average particle size of inlet plastic, the dimensions of the macerator 10 relative to a) the inlet particle size, b) the inlet plastic and/or carrier flow rate, c) the dimensions of the inlet conduit to the macerator, and/or d) the type or types of inlet plastic. It may also be dependent on, either separately or in addition, the dimensions or other characteristics of the agitator, the fill level of the agitator, the relative proportions of plastic and solvent in the agitator, and the agitator RPM rate.

The slot or apertures in the bodies provide elongate sections of the bodies adjacent the slot or aperture having a leading and trailing edge.

In one embodiment the leading edge and trailing edge of the elongate sections of the body are positioned parallel to the notional circumference of the rotational axis of the body.

In an alternate embodiment the leading edge of the elongate sections of the body are positioned at an angle to the notional circumference of the rotational axis of the body. Preferably the leading edge is positioned at an angle of about 5, 10, 15, 20, 25 or 30 degrees relative to the notional circumference of the rotational axis of the body, and suitable ranges may be selected from between any of these values, (for example, about 5 to about 30, about 5 to about 25, about 5 to about 20, about 5 to about 15, about 10 to about 40, about 10 to about 20, about 10 to about 15, about 15 to about 30, about 15 to about 25 or about 20 to about 30 degrees).

Each body (inner body 14 and the outer body 15) may have at least one or a plurality of apertures 16. The apertures 16 extend through the respective body. The apertures 16 define a flow path through each body.

The inlet slurry may traverse the flow path from the macerator inlet 17 to the macerator outlet 18 via the at least one aperture 16 of each body to produce an outlet slurry.

In some embodiments, the macerator 10 may comprise one or more inlets 17. The macerator inlets 17 may be spaced equidistantly about the macerator housing.

The inlet slurry may be provided at pressure to the inlet of the macerator. In some embodiments the rotation of the bodies is configured to draw in said inlet slurry.

The inner and outer bodies of the macerator are separated from each other by about 0.5, 1.0, 1.5, 2.0, 2.5, 3.0, 3.5, 4.0, 4.5 or 5.0 μm and suitable ranges may be selected from between any of these values, (for example, 0.5 to about 5.0, about 0.5 to about 4.0, about 0.5 to about 3.0, about 1.0 to about 5.0, about 1.0 to about 4.0, about 1.0 to about 3.0, about 1.5 to about 5.0, about 1.5 to about 4.5, about 1.5 to about 3.5, about 2.0 to about 5.0, about 2.0 to about 4.0, about 2.0 to about 3.5, about 2.5 to about 5.0, about 2.5 to about 4.5, about 2.5 to about 3.5, about 3.0 to about 5.0, about 3.0 to about 4.0, about 3.5 to about 5.0, about 3.5 to about 4.5, about 3.5 to about 4.0, about 4.0 to about 5.0 μm).

The inner and outer bodies of the macerator are separated from each other by about 20, 30, 40, 50, 60, 80, 90, 100, 110, 120, 130, 140, 150, 160, 170, 180, 190, 200 μm, and suitable ranges may be selected from between any of these values, (for example, about 20 to about 200, about 30 to about 200, about 40 to about 200, about 50 to about 200, about 60 to about 200, about 70 to about 200, about 80 to about 200, about 90 to about 200, about 100 to about 200, about 110 to about 200, about 120 to about 200, about 130 to about 200, about 140 to about 200, about 150 to about 200, about 160 to about 200, about 170 to about 200, about 180 to about 200, about 190 to about 200, about 20 to about 30, about 20 to about 40, about 20 to about 50, about or 20 to about 60 μm).

In an alternate embodiment the inner and outer bodies of the macerator are separated from each other by less than about 60, 55, 40, 35, 30, 25, or 20 μm, and suitable ranges may be selected from between any of these values, (for example, about 20 to about 25, about 20 to about 30, about 20 to about 35, about 20 to about 40, about 20 to about 55, about 20 to about 60, about 20 to about 25, about 30 to about 40, about 30 to about 55, about 30 to about 60, about 40 to about 55, or about 40 to about 60).

The rotation of the inner body relative to the outer body applies a shear stress to the plastic particles as they pass through the apertures 16 of the outer body 15 through the intermediate space between the outer body 15 and the inner body 14 and through the apertures 16 of the inner body 14, to the outlet.

In relation to the inlet particle size it will be appreciated that the dimensions of the slot or aperture will be dependent on the inlet particle size for that particular body. For example, as mentioned the particle must be sized to be able to enter through the slot or aperture. If the particle is larger than the slot or aperture then it will not be able to enter the slot or aperture and be cut. Additionally, consideration must be had of the velocity of relative rotation of adjacent bodies. That is, the time at which the slots or apertures in successive bodies line up and then close is called the time to closure. For example, at some point the slot or aperture of adjacent bodies will line up and then the gradually close as the bodies rotate relative to each other. Thus the slot or aperture must be larger than the size of the particle to provide additional slot or aperture width for the particle to traverse. The rate of closure will increase as the relative rotational speed of adjacent bodies increased.

In one embodiment the slot or aperture width is at least 3.5, 4.0, 4.5, 5.0, 5.5, 6.0, 6.5, 7.0, 7.5, 8.0, 8.5× the average particle size of the plastic particles traversing that slot or aperture, and suitable ranges may be selected from between any of these values, (for example, about 3.5 to about 8.5, about 3.5 to about 7.5, about 3.5 to about 6.0, about 3.5 to about 5, about 4.0 to about 8.5, about 4.0 to about 8.0, about 4.0 to about 7.0, about 4.0 to about 6.5, about 4.5 to about 8.5, about 4.5 to about 7.5, about 4.5 to about 5.5, about 5.0 to about 8.5, about 5.0 to about 8.0, about 5.5 to about 7.5, about 5.5 to about 6.5, about 6.0 to about 8.5, about 6.0 to about 8.0, about 6.5 to about 7.5× the average particle size of the plastic particles traversing that slot or aperture).

FIGS. 1A to 1C, 2 and 4 show apertures 16 in the inner body 14 however apertures 16 are not shown in the outer bodies for simplicity.

In some embodiments, the apertures 16 of the inner body 14 may be approximately half the size of the apertures 16 of the outer body 15, or the apertures 16 of the outer body 15 are approximately twice the size of the apertures 16 of the inner body 14. The reason for this is that as the plastic particles traverse the outer bodies they are cut to a smaller size, and thus the next bodies' aperture size can be decreased. Alternately, where there are three or more bodies, the rotational speed of the third body could be increased which will increase the rate of closure of the second body relative to the third body, but due to the smaller particle size the particles will still traverse through the aperture or slot.

Thus in one embodiment the slot or aperture width of successive bodies decreases. Alternately, the rotational speed of successive bodies increases to increase the rate of closure. Alternately, a combination of the two could be done. That is increasing the rate of rotation of successive bodies while also decreasing width of the slot or aperture.

In some embodiments, the outlet 12 of the macerator is provided internal to the inner body 14, and the inlet 11 is provided external to the outer body 15.

The macerator 10 may comprise a housing to house the pairs of bodies 13. In some embodiments, a motor may be coupled or connected to said housing so as to rotate the inner body 14 relative to the outer body 15.

The outlet slurry from the macerator 10 may have a plastic particle size being less than a predetermined plastic particle size. In some embodiments, the predetermined particle size is less than about 20, 19, 18, 17, 16, 15, 14, 13, 12, 11, 10, 9, 8, 7, 6, 5, 4, 3, 2, 1, or 0.5 µm, and suitable ranges may be selected from between any of these values.

The apertures 16 may be or comprise one or more slots 17. The slots 17 may be located vertically, and/or in a direction from the top of the body to the bottom of the body. The slots 17 may be oriented in a direction along or parallel with an axis of rotation or the body. In some embodiments, the slots 17 may be oriented in a direction with respect to a length of the body.

As shown in FIG. 1E, in some embodiments, the slots 17 may be angled with respect to a vertical or axial axis ("C" of FIGS. 1E and 1F), or an axis of rotation of the body, or an axis parallel to a vertical or axial axis, or an axis of rotation of the body. In some embodiments, the slots 17 may be angled with respect to a length of the body. As shown in FIGS. 1E and 1F the slots or apertures are angled relative to a vertical or horizontal axis (i.e. which ever is the axis of rotation which depends on the orientation of the macerator). Note that FIG. 1F is merely FIG. 1E on its side. In one embodiment the slots or aperture are angled 3, 4, 5, 6, 7, 8, 9, 10, 11, 12, 13, 14 or 15° from the axis of rotation, and suitable ranges may be selected from between any of these values, (for example, about 3 to about 15, about 3 to about 12, about 3 to about 11, about 3 to about 10, about 3 to about 9, about 3 to about 8, about 3 to about 7, about 3 to about 6, about 4 to about 15, about 4 to about 13, about 4 to about 10, about 4 to about 8, about 4 to about 7, about 4 to about 6, about 5 to about 15, about 5 to about 12, about 5 to about 10, about 5 to about 9, about 5 to about 8, about 5 to about 7, about 5 to about 6, about 6 to about 15, about 6 to about 14, about 6 to about 11, about 6 to about 9, about 6 to about 8, about 7 to about 15, about 7 to about 14, about 7 to about 13, about 7 to about 10, about 7 to about 8, about 8 to about 15, about 8 to about 10, about 9 to about 15, about 9 to about 13° from the axis of rotation).

In one embodiment the slots or apertures or successive bodies are angled oppositely to each other. For example, where an outer body has the slots or apertures angled +7.5° relative to the axis of rotation, the next body has the slots or apertures angled −7.5° relative to the axis of rotation. Thus, the relative angle of the slots or apertures to each other is doubled in this instance to 15°. It will be appreciated that each body can have the slots angled at any angle as mentioned above between 3 and 15° but in this instance each successive body has them angled oppositely relative to the axis of rotation so that the angle of the slots of adjacent bodies is the cumulative angle of both bodies.

In some embodiments, the slots of the outer body are wider than the slots of the inner body. For example, the slots of the outer body may be about 1.5 to about 2.5 times wider than the slots of the inner body. As a further example, the slots of the outer body may be about 2 times wider than the slots of the inner body.

In some embodiments, at least one slot of the outer body comprises a projection from the outer surface of the outer body. This projection may comprise a blade.

The projection from the outer surface of the outer body preferably extends in the direction of rotation of the outer body at an acute angle relative to the outer surface of the outer body. For example, the projection may extend at an angle of about 5, 10, 15, 20, 25 or 30 degrees. As a further example, the projection may extend at an angle of about 15 degrees.

In some embodiments a width of the one or more slots 17 is substantially constant along a length of the slot 17. In some embodiments the width of the slots 17 varies along a length of the slot 17.

The slots 17 may vary in width from an outer surface of the body to an inner surface of the body. The slots 17 may taper in width from an outer surface of the body to an inner surface of the body, or from an inner surface of the body to an outer surface of the body.

The slot at an outer surface may be greater than a width of the slot at an inner surface. The width of the slot at an inner surface is greater than a width of the slot at an outer surface.

The width of the one or more slots 17 are 1, 2, 3, 4, 5, 6, 7, 8, 9, 10, 11, 12, 13, 14 or 15 mm, and suitable ranges may be selected from between any of these values (for example, 1 to about 15, about 1 to about 12, about 1 to about 10, about 1 to about 8, about 2 to about 15, about 2 to about 13, about 2 to about 11, about 2 to about 9, about 2 to about 7, about 3 to about 15, about 3 to about 14, about 3 to about 10, about 3 to about 8, about 4 to about 15, about 4 to about 13, about 4 to about 11, about 4 to about 10, about 407, about 5 to about 15, about 5 to about 14, about 5 to about 12, about 5 to about 10, about 5 to about 8, about 6 to about 15, about 6 to about 13, about 6 to about 12, about 6 to about 8, about 7 to about 15, about 7 to about 14, about 7 to about 11, about 7 to about 9, about 8 to about 15, about 8 to about 14, about 8 to about 11, about 9 to about 15, about 9 to about 13, about 9 to about 11, about 10 to about 15, about 10 to about 13, about 11 to about 15, about 11 to about 14 or about 12 to about 15 mm).

The width of the one or more slots 17 may be between about 1 and about 15 mm, or about 1 mm, or about 3 mm, or about 4 mm, or about 5 mm, or about 6 mm, or about 7 mm, or about 8 mm, or about 9 mm, or about 10 mm, or about 11 mm or about 12 mm, or about 13 mm, or about 14 mm, or about 15 mm, or about 16 mm, or about 17 mm, or about 18 mm, or about 19 mm, or about 20 mm.

The inner body 14 may be rotatable about an axial axis, and the outer body 15 may be stationary.

Alternatively, the outer body 15 may be rotatable about an axial axis, and the inner body 14 is stationary.

In some embodiments the inlet body configured to provide for an inlet flow path for the pair of bodies, may be stationary, and the outlet body configured to provide for an outlet flow path for the pair of bodies may be rotating.

One or more of the inner body 14 and the outer body 15 are rotatable about an axial axis.

The macerator 10 may comprise an inner body shaft 20. The inner body shaft 20 may be coupled to the inner body 14 and/or one or more inner bodies to allow for rotation of the inner body 14 and/or one or more inner bodies relative to an axial axis of the inner body and/or one or more inner bodies. In some embodiments, the inner body shaft 20 is provided with a pair of high speed water cooled bearings to allow for rotation of the inner body shaft 20.

In one embodiment each of the bodies of the macerator 10 are on a common shaft. In one embodiment the bodies are connected to a shaft, with each bodies shaft being located within another shaft. Preferably the macerator comprises a gear box that allows for one or more bodies of the macerator to have a direction of rotation different to one or more of other bodies of the macerator 10.

The macerator 10 may comprise an outer body shaft 21. The outer body shaft 21 may be configured to be coupled to the outer body 21 and/or one or more outer body to allow for rotation of the outer body 15 and/or one or more outer body relative to an axial axis of the outer body 15 and/or one or more outer body. In some embodiments, the outer body shaft 21 is provided with a pair of high speed water cooled bearings to allow for rotation of the inner body shaft 20.

The inner body shaft 20 and/or the outer body shaft 21 may be coupled to at least one motor 22. The at least one motor 22 may be configured to rotate the inner body shaft 20 and/or the outer body shaft 21.

The macerator 10 may include a liquid cooled bearing (not shown) on the body shaft. The advantage of this design is that the slurry liquid is used to cool the bearing, which would otherwise operate at high temperatures due to the heat produced by the maceration of the plastic.

The inner body 14 or the outer body 15 may be an inlet body configured to provide for an inlet flow path for the pair of bodies. The other of the inner body 14 or the outer body 15 may be an outlet body configured to provide for an outlet flow path for the pair of bodies.

A width or other dimension, or largest dimension of the at least one aperture 16 of the inlet body 14 may be greater than a width or other dimension, or largest dimension of the at least one aperture 16 of the outlet body 15.

The macerator 10 may comprise a plurality of pairs of bodies. Each pair of bodies may be located concentrically with respect to each other pair of bodies.

The macerator 10 may comprise at least a first pair of bodies, and a second pair or bodies. In some embodiments the macerator 10 may comprise a third pair or bodies. In some embodiments the macerator 10 may comprise one or more further pairs of bodies.

The flow path from an inlet of the macerator 10 to the outlet of the macerator 10 may be through the first pair of bodies, followed by the second pair or bodies, and optionally through the third pair or bodies, and optionally through said one or more further pairs of bodies.

The progression of the slurry through each pair of bodies is configured to progressively decrease a particle size of plastic in the slurry. The number of pairs of bodies, the size of the apertures in the each body, and the distance between the pair of bodies may be customised based on the characteristics of the inlet slurry, and the desired characteristics of the outlet slurry. In some embodiments, the surface area of the bodies may be based on the desired flow rate of inlet slurry and/or the desired outlet particle size.

The first pair of bodies 18 may comprises an inlet body (being one of the inner body or the outer body), and a width or other dimension, or largest dimension of the apertures of the inlet body, for example, may be about 20 mm.

The first pair of bodies 18 may comprises an outlet body (being the other of the inner body and the outer body), and a width or other dimension, or largest dimension of the apertures of the outlet body, for example, may be about 17 mm.

The second pair of bodies 19 may comprise an inlet body (being one of the inner body or the outer body) wherein a width or other dimension, or largest dimension of the apertures of the inlet body, for example, may be about 17 mm.

The second pair of bodies 19 may comprise an outlet body (being the other of the inner body and the outer body) wherein a width or other dimension, or largest dimension of the apertures of the outlet body, for example, may be about 12 mm.

The third pair of bodies may comprise an inlet body (being one of the inner body or the outer body) wherein a width or other dimension, or largest dimension of the apertures of the inlet body, for example, may be about 12 mm.

The third pair of bodies may comprise an outlet body (being the other of the inner body and the outer body) wherein a width or other dimension, or largest dimension of the apertures of the outlet body, for example, may be about 3 mm.

The flow path from the macerator inlet to the macerator outlet may be provided through the apertures of each body of each pair of bodies.

The flow path from the macerator inlet to the macerator outlet may be provided from an innermost body to an outermost body via each intermediate body.

The flow path from the macerator inlet to the macerator outlet may be provided from an outermost body to an innermost body via each intermediate body.

The flow of inlet slurry may be provided to internal surface of the inner body 14 and/or an internal surface of the inner body 14 of the innermost pair of bodies. For example where the inner body 14 of the innermost pair of bodies acts as an inlet body.

The flow of inlet slurry may be provided to external surface of the outer body 15 and/or an external surface of the outer body 15 of the outermost pair of bodies. For example where the outer body 15 of the outermost pair of bodies acts as an inlet body.

In one embodiment the flow of slurry may be across the macerator as shown in FIG. 1B. For example, the inlet may be to the bottom of the macerator as shown in FIG. 1B and then flows through the macerator and outlets the top of the macerator. That is, the slurry goes through each layer of body to the centre of the macerator and then traverses each layer of the bodies to outlet the macerator. Therefore, for a macerator with a pair of bodies, the slurry will traverse two pairs of slots or apertures between the inlet and the outlet. With a macerator having three bodies, the slurry will traverse six slots or apertures, three on the bottom of the macerator and then three on the way to the outlet from the centre of the macerator. It will be appreciate that the macerator will include baffles or blockages to prevent the slurry from going around the side of the bodies. That is, the macerator will include one or more flow guides that direct the slurry though the slot or apertures of the macerator. In this embodiment the fact that plastic floats is useful as it assist s the plastic from moving through the macerator from the bottom to the top across the bodies. Combined with inletting the slurry at pressure assists movement of the particles across the macerator.

In one embodiment the inlet of slurry to the macerator is substantially spread along the length of the macerator. Preferably the inlet comprises a manifold.

In some embodiments the inlet body is stationary, and the outlet body rotates relative to the inlet body.

The inlet slurry may comprises plastic particles having a particle size of 4 mm to 20 mm, and optionally around 8 mm.

The outlet slurry may comprise plastic particles having a particle size of 0.5 μm to 20 μm.

The outlet slurry (after passing through the macerator 10) may comprise plastic particles having a plastic particle size. The plastic particle size is less than a predetermined plastic particle size.

In some embodiments, the predetermined plastic particle size is less than 0.5, 1, 2, 3, 4, 5, 6, 7, 8, 9, 10, 11, 12, 13, 14, 15, 16, 17, 18, 19 or 20 μm.

In some embodiments, if the plastic particle size is greater than the predetermined plastic particle size the outlet slurry may be directed to the macerator inlet 11 (for example cycled through the macerator 10 again), and/or to another macerator inlet 11 (for example to a further macerator inlet 11 of another macerator 10) until the outlet slurry has a particle size being less than the predetermined particle size.

In some embodiments the flow rate of inlet slurry provided to the macerator 10 may be based on one or more of: the plastic type and its particular characteristics for example the plastic melting point, the size of the apertures in the bodies, the overall surface are of the bodies, or the ratio of liquid to plastic in the slurry.

Also disclosed is a system 50 for processing plastic. The system may comprise an inlet configured to receive a system inlet slurry comprising plastic particles, and an outlet configured to deliver a system outlet slurry. The system may also comprise a maceration stage 51. The maceration stage 50 decreases the particle size of the plastic particles within the slurry, as the slurry passes through the maceration stage 51. The maceration stage 51 may comprise one or more macerator 10, as described above. The system inlet slurry may be provided to the maceration stage 51 so as to produce the system outlet slurry.

The system may comprise a plurality of macerators. At least two of the plurality of macerators may be arranged in series. Alternatively or additionally, at least two of the plurality of macerators may be arranged in parallel.

The outlet slurry of one of the one or more macerators 10 may be configured to be directed to the inlet of another of the one or more macerators, and/or to the inlet of the same macerator 10.

The system 50 may comprise at least a first macerator 52, and a second macerator 53, optionally the system comprises a third macerator 54, and optionally one or more further macerators 55.

One or more filter elements may be located between the output of one macerator and the input of another macerator. The one or more filter elements may filter out or prevent the passing of particles above a certain particle size. The one or more filter elements may be configured to ensure particles which are too large for the subsequent macerator (for example particles which might cause the macerator to become clogged) are not provided to the subsequent or next macerator.

A flow path may be provided from the inlet of the system to the outlet of the system via the first macerator 52, followed by the second macerator 53, and optionally followed by the third macerator 54, and optionally followed by one or more further macerators 55.

The first macerator 52 may comprise an inlet body (being one of the inner body 14 or the outer body 15). A width or other dimension, or largest dimension of the apertures 16 of the inlet body is about 20 mm, and an outlet body (being the other of the inner body and the outer body) wherein a width or other dimension, or largest dimension of the apertures of the outlet body is about 17 mm.

The second macerator 53 may comprise an inlet body (being one of the inner body or the outer body). A width or other dimension, or largest dimension of the apertures of the inlet body is about 17 mm, and an outlet body (being the other of the inner body and the outer body) wherein a width or other dimension, or largest dimension of the apertures of the outlet body is about 12 mm.

The third macerator 54 may comprise an inlet body (being one of the inner body or the outer body). A width or other dimension, or largest dimension of the apertures of the inlet body is about 12 mm, and an outlet body (being the other of the inner body and the outer body) wherein a width or other dimension, or largest dimension of the apertures of the outlet body is about 3 mm.

The system outlet slurry may comprise plastic particles having a plastic particle size. In some embodiments the plastic particle size is less than a predetermined plastic particle size.

The predetermined plastic particle size may be less than 0.5, 1, 2, 3, 4, 5, 6, 7, 8, 9, 10, 11, 12, 13, 14, 15, 16, 17, 18, 19 or 20 µm, and suitable ranges may be selected from between any of these values.

In some embodiments, if the plastic particle size is greater than the predetermined plastic particle size the outlet slurry of one of the plurality of macerators is directed to the macerator inlet (for example being cycled back into the same macerator), and/or to another macerator inlet (for example of another macerator 10 of the plurality of macerators) until the outlet slurry has a particle size of less than the predetermined particle size.

The inlet slurry may be recycled through the maceration stage 51 until the outlet slurry has a particle size of less than the predetermined particle size.

The time to pass through the macerator may be controlled by modifying the speed of relative rotation between the inner body and the outer body, and/or the spacing between the inner body and the outer body, and/or the flow rate of the slurry, and/or the particle sizes of the particles in the slurry.

In some embodiments, the flow rate of the solvent through the macerator 10 may be about 10 litres per minute to about 1000 litres per minute. In particular, the flow rate of the solvent through the macerator 10 may be approximately 100 litres per minute.

In some embodiments, the ratio of carrier solvent such as water to plastic provided to the macerator is at a ratio of approximately 1 litre to 0.5 kg, to approximately 1 litre to 1.5 kg.

In some embodiments, the ratio of carrier solvent such as water to plastic provided to the macerator is at a ratio of approximately 1 litre to 1 kg.

4. Refiner

The system may further comprise a refining stage 70. The refining stage 70 may comprise at least one refiner. The refining stage 70 may be located after the maceration stage 51 to receive the macerated slurry from the maceration stage 51. In some embodiments, where there are enough macerators 10 in the maceration stage 50 the refining stage 70 may be omitted.

The refiner may comprise an inner sheath 71. The inner sheath 71 having a plurality of apertures 72. The polished may further comprise an outer sheath 73 about one side or surface of the inner sheath to define an inlet between the inner and outer sheaths, and an outlet on the other side of the inner sheath to define a flow path from the inlet via the apertures to the outlet.

The inner sheath 71 and outer sheath 72 may be conical or frusto-conical.

The inner sheath 71 may be a substantially continuous surface.

The outer sheath 72 may be or comprise a mesh or grid-type material. The apertures 72 may be provided by the mesh material.

The inner sheath 71 may be or comprise a mesh or grid-type material, and the outer sheath 72 may be a substantially continuous surface.

In some embodiments the spacing between the inner sheath 71 and outer sheath 72 is substantially constant.

In some embodiments the spacing between the inner sheath 71 and outer sheath 72 is less than 10 mm. In some embodiments the spacing between the inner sheath 71 and outer sheath 72 is less than 5 mm, or less than 4 mm, or less than 3 mm.

In some embodiments the spacing between the inner sheath 71 and outer sheath 72 is about 1 mm to about 2 mm.

5. Process

The use of the process preferably produces particles having a mean particle size of less than 20, 19, 18, 17, 16, 15, 14, 13, 12, 11, 10, 9, 8, 7, 6, 5, 4, 3, 2, 1, 0.5 µm, and suitable ranges may be selected from between any of these values (for example, 1 to about 20, about 1 to about 19, about 1 to about 15, about 1 to about 10, about 1 to about 5, about 2 to about 20, about 2 to about 19, about 2 to about 14, about 2 to about 10, about 2 to about 8, about 2 to about 4, about 3 to about 20, about 3 to about 17, about 3 to about 15, about 3 to about 11, about 3 to about 7, about 3 to about 5, about 4 to about 20, about 4 to about 16, about 4 to about 12, about 4 to about 10, about 4 to about 8, about 4 to about 6, about 5 to about 20, about 5 to about 17, about 5 to about 13, about 5 to about 10, about 5 to about 7, about 6 to about 20, about 6 to about 18, about 6 to about 14, about 6 to about 11, about 6 to about 8, about 7 to about 20, about 7 to about 13, about 7 to about 10, about 8 to about 20, about 8 to about 18, about 8 to about 15, about 8 to about 10, about 9 to about 20, about 9 to about 16, about 9 to about 11, about 10 to about 20, about 10 to about 18, about 10 to about 15, about 10 to about 14, about 11 to about 20, about 11 to about 18, about 11 to about 14, about 12 to about 20, about 12 to about 18, about 12 to about 15, about 13 to about 20, about 13 to about 17, about 13 to about 15, about 14 to about 20, about 14 to about 16, about 15 to about 20 µm).

The process comprises providing to a macerator plastic particles having a particle size of less than 0.5, 1.0, 1.5, 2.0, 2.5, 3.0, 3.5 or 4.0 mm, whereby the macerator(s) processes the plastic particles to a particle size of less than 0.5, 1, 2, 3, 4, 5, 6, 7, 8, 9, 10, 11, 12, 13, 14, 15, 16, 17, 18, 19 or 20 µm (optionally being the predetermined particle size).

In some embodiments the process includes the in-line use of an agitator as described that reduces the waste plastic to the particle size of 0.5, 1.0, 1.5, 2.0, 2.5, 3.0, 3.5 or 4.0 mm.

In some embodiments the process includes the in-line use of a coarse processing unit, such as a cutting and/or extruders, shredders, granulators or grinder that reduces the plastic to a particle size of about 5, 6, 7, 8, 9, 10, 11, 12, 13, 14, 15, 16, 17, 18, 19 or 20 mm.

In some embodiments the process for processing the plastic comprises
  providing a macerator and optionally providing a refiner,
  the macerator having an inlet and an outlet, the macerator comprising one or more pairs of bodies, the pair of bodies comprising an inner body and an outer body that rotate relative to each other, the inner and outer bodies being separated from each other by less than 1.2 mm, and each body comprising a plurality of apertures to define a flow path through each body,
  if present, the refiner comprising an inner sheath, having a plurality of apertures, and an outer sheath about one side of the inner sheath to define an inlet between the inner and outer sheaths, and an outlet on the other side of the inner sheath to define a flow path from the inlet via the apertures to the outlet,
  introducing a slurry to the macerator inlet, the slurry comprising plastic particles having a particle size of 4 mm to 20 mm, wherein the slurry traverses the flow path from the macerator inlet to the macerator outlet via the apertures of each body to produce a slurry having a plastic particle size, such that if the particle is greater than 0.5 µm, or 1 µm or a predetermined particle size the slurry is i) directed to the macerator inlet or a macerator inlet of another macerator until the outlet slurry has a particle size of less than 0.5 µm, or 1 µm, or a predetermined particle size ii) introduced to the refiner inlet to traverse the flow path via the inner sheath aperture to the refiner outlet, to produce a plastic having a particle size less than 0.5 µm, or 1 µm, or a predetermined particle size iii) a combination of (i) and (ii);

such that the method of processing plastic produces a slurry comprising plastic having a particle size less 0.5 µm, or 1 µm, or a predetermined particle size.

In some embodiments, if the particle is greater than 0.5 µm, or 1 µm, or a predetermined particle size the slurry is i) directed to the macerator inlet or a macerator inlet of another macerator until the system outlet slurry has a particle size of less than a predetermined plastic particle size, or ii) introduced to the refiner inlet to traverse the flow path via the inner sheath aperture to the refiner outlet, to produce a plastic having a particle size less than a predetermined plastic particle size, or iii) a combination of (i) and (ii).

In some embodiments the system 50 further comprises an emulsification stage, optionally the emulsification stage located subsequent to the refining and maceration stages.

The emulsification stage may be configured to generate a substantially homogeneous slurry.

One or more additives may be provided to the emulsification stage to increase or decrease the viscosity of the slurry. The one or more additives may include cornflour.

In some embodiments the system further comprises a water cooling system configured to cool the macerator, and emulsion units, optionally cooling any bearings.

6. Macerator Embodiments

The outer body preferably rotates relative to the inner body on an outer body rotational axis. The inner body also preferably rotates relative the outer body on an inner body rotational axis.

In some embodiments, either or preferably both of the outer body and inner body comprise a body having a substantially circular cross section, when the cross-section is take along the respective rotational axis of the inner body and outer body.

In some embodiments, the rotational axes of the inner body and outer body are aligned so that the inner body and outer body are concentric with each other.

In some embodiments, either or preferably both of the inner body and outer body may either comprise cylindrical bodies, frusto-conical bodies, or conical bodies. An example of a macerator comprising cylindrical bodies is seen for example in FIG. 1.

Figure 10:
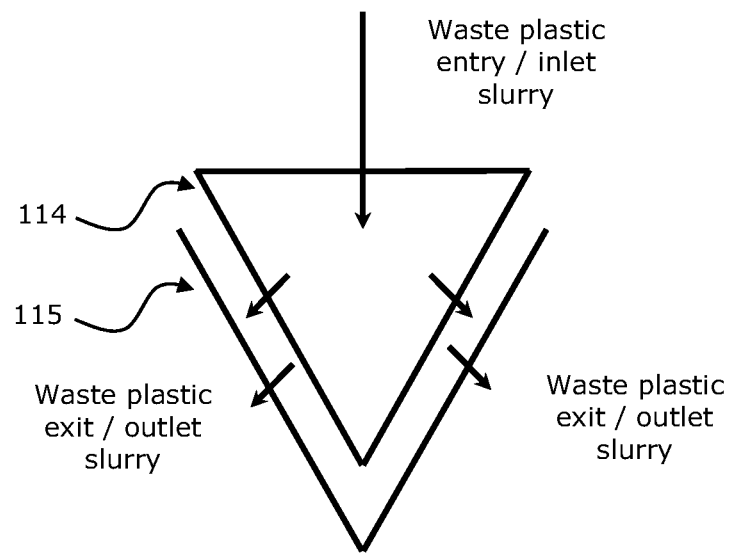
FIG. 10 shows a section view through an embodiment of a macerator.

An example of a macerator having an inner conical body 114 and an outer conical body 115 is seen in FIG. 10. An example view of a macerator having an inner frusto-conical body 214 and an outer frusto-conical body 215 is seen in FIG. 11.

Figure 11:
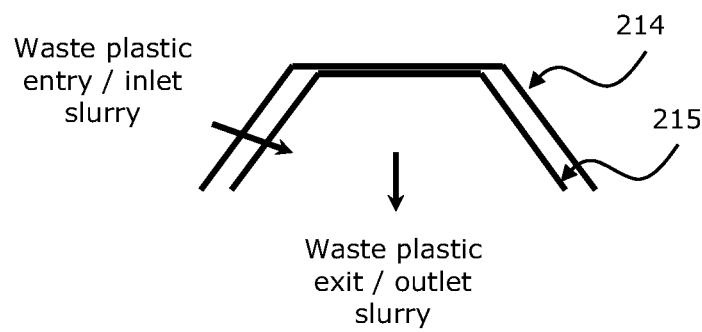
FIG. 11 shows a section view through an embodiment of a macerator.

The section views of FIGS. 10 and 11 are taken along a rotational axis of the inner body and outer body. In FIG. 10 the input material is shown passing into the inner cone 114, through the apertures of each of the inner cone and the outer cone, and finally from the outside of the outer cone 115 as an outlet slurry. In alternative forms the flow through the macerator of FIG. 10 may be reversed, such that the input flow passes through the outer cone first, then through the inner cone, and exits from the inside of the inner cone as an outlet slurry.

An example of such a configuration is seen in frusto-conical macerator of FIG. 11. As seen in FIG. 11, the inlet slurry passes first through the apertures of the outer frusto-conical body 214, then through the apertures of the inner frusto-conical body 215, to exit as outlet slurry from the inner frusto-conical body.

7. Products

The process produces plastic have a particle size less than 0.5, 1, 2, 3, 4, 5, 6, 7, 8, 9, 10, 11, 12, 13, 14, 15, 16, 17, 18, 19 or 20 µm, and suitable ranges may be selected from between any of these values.

In some embodiments the plastic particles have a size distribution whereby at least 90, 91, 92, 93, 94 or 95% of the plastic particles have a mean particle diameter of 0.5, 1, 2, 3, 4, 5, 6, 7, 8, 9, 10, 11, 12, 13, 14, 15, 16, 17, 18, 19 or 20 µm.

In various embodiments, the plastic particles of the present invention have a particle size distribution whereby at least 90% of the granules have a diameter of 0.5, 1, 2, 3, 4, 5, 6, 7, 8, 9 or 10 µm. In one embodiment, the invention relates to a population of plastic particles wherein at least 90% of the granules have a diameter within 1 µm of the mean diameter of the population.

The plastic particles of the process of the invention can be used in a range of products such as
- concrete products (e.g. pre-cast concrete or concrete blocks),
- wood-containing products (e.g. composite boards, plywood and laminated veneer lumber, and reconstituted wood products such as particle board, oriented strand board and the like),
- reconstituted plastic products, and
- roading material.

In one embodiment the invention provides for the production of a base ingredient as an emulsion, for use in the production of a composite plastic product, the base ingredient comprising
- a first component, being a slurry comprising plastic particles having a mean particle diameter of less than 0.5, 1, 2, 3, 4, 5, 6, 7, 8, 9, 10, 11, 12, 13, 14, 15, 16, 17, 18, 19 or 20 µm, the plastic particles in the first component comprising 50 to 80% polyethylene and 20 to 50% of other plastics;
- a second component comprising at least 40% of a paper and a substrate, the substrate selected from wood, rubber, concrete or a combination thereof;
- wherein the first and second components are mixed to produce an emulsion.

EXAMPLE

1. Example 1—Wood Board

TABLE 1

| Component | Weight (kg) |
| --- | --- |
| Wood chip (optionally, long strand between about 10 mm and 100 mm) | 0.65 |
| Saw dust | 1.5 |
| High-density polyethylene (HDPE) Powder | 1.5 |

TABLE 1-continued

| Component | Weight (kg) |
| --- | --- |
| Cross linker (optionally an organic peroxide, optionally Luperox) | 0.2 |

The components may be mixed and press formed at a force of between about 100 tonnes and 200 tonnes, at a temperature of between about 180° C. and about 200° C.

The components may comprise approximately 95% waste plastic.

2. Example 2—Impact Board

TABLE 2

| Component | Weight (kg) |
| --- | --- |
| Paper Fine Grind (approximately 1 mm) | 0.8 |
| IBC Grinds (from macerator) | 1.0 |
| IBC Crum (optionally about 8 mm) | 1.7 |
| High-density polyethylene (HDPE) Powder | 0.5 |

The components may be mixed and press formed at a force of between about 100 tonnes and 200 tonnes, at a temperature of between about 180° C. and about 200° C.

The components may comprise approximately 100% waste plastic.

3. Example 3—Paper Board

TABLE 3

| Component | Weight (kg) |
| --- | --- |
| Paper Fine Grind (approximately 3 mm) | 0.3 |
| IBC Grinds (from macerator) | 1.0 |
| IBC Crum (optionally about 8 mm) | 1.0 |
| High-density polyethylene (HDPE) Powder | 0.5 |
| Cross linker (optionally an organic peroxide, optionally Luperox) | 0.1 |
| MDI | 0.2 |

The components may be mixed and rolled at a pressure of around 14 tonnes.

The components may comprise approximately 100% waste plastic.

4. Example 4—Roading

TABLE 4

| Component | Weight (kg) |
| --- | --- |
| Plastic Polystyrene | 1.5 |
| Methyl Chloride | 4.0 |
| Polyols (Blended) | 0.8 |
| Coating Stones or another filling | 3.0 |
| MDI | 0.8 |

The components may comprise approximately 21% waste plastic.

We claim:

1. A macerator for processing a slurry, the macerator comprising:
a housing that defines a chamber, an inlet, and an outlet, the inlet configured to receive a flow of slurry; and
three or more concentric bodies, each concentric body comprising a plurality of apertures to define a flow path through each concentric body, and one or more of the concentric bodies rotates relative to an adjacent concentric body,
wherein the slurry traverses the flow path from the inlet to the outlet via the apertures of each concentric body to produce an outlet slurry, and
wherein the apertures cut particles of the slurry as the particles traverse the apertures in the flow path to produce cut particles that are smaller than the particles in the slurry.

2. The macerator of claim 1, wherein each concentric body is separated from each other by up to about 0.2 mm.

3. The macerator of claim 1, wherein the apertures comprise a plurality of slots that are angled with respect to a vertical or axial axis of the concentric body, or the axis of rotation of the macerator.

4. The macerator of claim 3, wherein the slots of adjacent concentric bodies are angled opposite to each other relative to the axis of rotation of the macerator.

5. The macerator of claim 3 wherein the slots are angled 3° to 15° relative to the axis of rotation of the macerator.

6. The macerator of claim 3 wherein the width of the slot of the concentric body is at least 3.5× to 8.5× of an average particle size of the particles traversing the slot of that concentric body.

7. The macerator of claim 3, wherein the three or more concentric bodies comprise an inner concentric body and an outer concentric body and the slots of the outer concentric body are 1.5 to about 2.5 times wider than the slots of the inner concentric body.

8. The macerator of claim 6, wherein the slots vary in width from an outer surface of the concentric body to an inner surface of the concentric body, and wherein the width of the slots at the outer surface is greater than a width of the slots at the inner surface.

9. The macerator of claim 6, wherein the width of the slots at an outlet side or surface is greater than a width of the slots at an inlet side or surface.

10. The macerator of claim 7, wherein:
the inner concentric body is rotatable about an axial axis, and the outer concentric body is stationary, or
the outer concentric body is rotatable about an axial axis, and the inner concentric body is stationary, or
the inner concentric body and the outer concentric body are rotatable about an axial axis, wherein the inner concentric body and the outer concentric body rotate in opposite directions.

11. The macerator of claim 7, wherein the macerator comprises:
an inner body shaft, the inner body shaft configured to be coupled to one or more of the inner concentric bodies to allow for rotation of the one or more inner concentric bodies relative to an axial axis of the one or more inner concentric bodies, and
an outer body shaft, the outer body shaft configured to be coupled to one or more of the outer concentric bodies to allow for rotation of the one or more outer concentric bodies relative to an axial axis of the one or more outer concentric bodies.

12. The macerator of claim 1, wherein a first concentric body, of the three or more concentric bodies, comprises an inlet body and an outlet body, wherein a width or largest dimension of the apertures of the inlet body is "A" mm, and a width or largest dimension of the apertures of the outlet body is about 0.8×"A" mm.

13. The macerator of claim 5 wherein the slots of successive concentric bodies are angled oppositely to each other.

14. The macerator of claim 1 comprises 4, 5, 6, or 7 concentric bodies.

* * * * *